US010645573B2

(12) United States Patent
Fleischman et al.

(10) Patent No.: US 10,645,573 B2
(45) Date of Patent: May 5, 2020

(54) POSTPONED CARRIER CONFIGURATION

(71) Applicant: Apple Inc., Cupertino, CA (US)

(72) Inventors: David Fleischman, Issaquah, WA (US);
Patrick Coffman, San Francisco, CA (US); Jeremy Wyld, San Jose, CA (US); Gregory N. Christie, San Jose, CA (US); Jerrold Von Hauck, Windermere, FL (US); Audra Men-jhi Liu, Sunnyvale, CA (US); Sebastien Sahuc, San Francisco, CA (US); Muralidhar S. Vempaty, San Jose, CA (US); Shruti Chugh, San Jose, CA (US); Ashutosh Chaubey, San Jose, CA (US); Dallas De Atley, San Francisco, CA (US); Jean-Marc Padova, San Francisco, CA (US); Heath Culp, Austin, TX (US); Bruno Posokhow, San Francisco, CA (US); Brian Cassidy, San Francisco, CA (US); John N. Lehner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/245,013

(22) Filed: Aug. 23, 2016

(65) Prior Publication Data
US 2016/0366585 A1 Dec. 15, 2016

Related U.S. Application Data

(63) Continuation of application No. 12/353,227, filed on Jan. 13, 2009, now Pat. No. 9,451,450.

(Continued)

(51) Int. Cl.
*H04M 3/00* (2006.01)
*H04W 8/26* (2009.01)
(Continued)

(52) U.S. Cl.
CPC ............. *H04W 8/265* (2013.01); *H04W 4/50* (2018.02); *H04W 8/183* (2013.01); *H04W 8/245* (2013.01)

(58) Field of Classification Search
CPC ....... H04W 8/265; H04W 8/18; H04W 4/001; H04W 4/24; H04W 48/16
(Continued)

(56) References Cited

U.S. PATENT DOCUMENTS 3,876,942 A 4/1975 Koster et al.
5,386,455 A 1/1995 Cooper et al.
(Continued)

FOREIGN PATENT DOCUMENTS

DE 19823074 A1 11/1999
EP 367361 A2 5/1990
(Continued)

OTHER PUBLICATIONS

Korean Patent Application No. 10-2014-106320—Office Action dated Apr. 10, 2015.
(Continued)

*Primary Examiner* — Khalid W Shaheed
(74) *Attorney, Agent, or Firm* — Dickinson Wright RLLP

(57) ABSTRACT

Methods, systems, and computer-readable medium for providing telecommunications carrier configuration at activation of a mobile device. In one implementation, a method is provided. The method includes receiving a request for activation of a mobile device, and during activation of the mobile device, determining for the mobile device a telecommunications carrier from a number of telecommunications (Continued)

carriers, and identifying information associated with the determined telecommunications carrier for configuring the mobile device.

20 Claims, 13 Drawing Sheets

Related U.S. Application Data

(60) Provisional application No. 61/021,025, filed on Jan. 14, 2008.

(51) Int. Cl.
*H04W 4/50* (2018.01)
*H04W 8/18* (2009.01)
*H04W 8/24* (2009.01)

(58) Field of Classification Search
USPC .......................................................... 455/419
See application file for complete search history.

(56) References Cited

U.S. PATENT DOCUMENTS

| | | | |
|---|---|---|---|
| 5,835,061 A | 11/1998 | Stewart | |
| 5,864,757 A * | 1/1999 | Parker | H04W 8/265 |
| | | | 340/5.54 |
| 6,134,435 A | 10/2000 | Zicker et al. | |
| 6,137,783 A | 10/2000 | Sallberg et al. | |
| 6,185,427 B1 | 2/2001 | Krasner et al. | |
| 6,199,045 B1 | 3/2001 | Giniger et al. | |
| 6,259,405 B1 | 7/2001 | Stewart et al. | |
| 6,263,214 B1 | 7/2001 | Yazaki et al. | |
| 6,323,846 B1 | 11/2001 | Westerman et al. | |
| 6,456,234 B1 | 9/2002 | Johnson | |
| 6,487,403 B2 | 11/2002 | Carroll | |
| 6,570,557 B1 | 5/2003 | Westerman et al. | |
| 6,611,687 B1 | 8/2003 | Clark et al. | |
| 6,615,213 B1 | 9/2003 | Johnson | |
| 6,677,894 B2 | 1/2004 | Sheynblat et al. | |
| 6,677,932 B1 | 1/2004 | Westerman | |
| 6,731,238 B2 | 5/2004 | Johnson | |
| 6,879,825 B1 | 4/2005 | Daly | |
| 6,888,536 B2 | 5/2005 | Westerman et al. | |
| 7,054,642 B1 | 5/2006 | Matz et al. | |
| 7,187,997 B2 | 3/2007 | Johnson | |
| 7,359,516 B1 | 4/2008 | Skinner et al. | |
| 7,929,959 B2 | 4/2011 | De Atley et al. | |
| 8,032,181 B2 | 10/2011 | Hauck et al. | |
| 8,442,521 B2 | 5/2013 | Fleischman et al. | |
| 8,712,474 B2 | 4/2014 | Gehrmann | |
| 9,451,450 B2 | 9/2016 | Fleischman et al. | |
| 2002/0082048 A1 | 6/2002 | Toyoshima | |
| 2002/0085530 A1 | 7/2002 | Toyoshima | |
| 2002/0197992 A1 | 12/2002 | Nizri et al. | |
| 2003/0083068 A1 | 5/2003 | Wong | |
| 2003/0119515 A1 | 6/2003 | Holler et al. | |
| 2004/0102183 A1 | 5/2004 | Haub et al. | |
| 2004/0121802 A1 | 6/2004 | Kim et al. | |
| 2004/0142725 A1 | 7/2004 | Kim | |
| 2004/0176133 A1 | 9/2004 | Lipsit | |
| 2004/0235458 A1 | 11/2004 | Walden et al. | |
| 2004/0242224 A1 | 12/2004 | Janik et al. | |
| 2004/0248550 A1 | 12/2004 | Hausner et al. | |
| 2004/0266336 A1 | 12/2004 | Patsiokas et al. | |
| 2005/0009502 A1 | 1/2005 | Little et al. | |
| 2005/0054338 A1 | 3/2005 | Hosokawa | |
| 2005/0079863 A1 | 4/2005 | Macaluso | |
| 2005/0120209 A1 | 6/2005 | Kwon et al. | |
| 2005/0141438 A1 | 6/2005 | Quetglas et al. | |
| 2005/0153741 A1 | 7/2005 | Chen et al. | |
| 2005/0239504 A1 | 10/2005 | Ishii et al. | |
| 2006/0035631 A1 | 2/2006 | White et al. | |
| 2006/0046717 A1 | 3/2006 | Bovell et al. | |
| 2006/0135144 A1 | 6/2006 | Jothipragasam | |
| 2006/0143098 A1 | 6/2006 | Lazaridis | |
| 2006/0154647 A1 | 7/2006 | Choi | |
| 2006/0205434 A1 | 9/2006 | Tom et al. | |
| 2007/0004386 A1 | 1/2007 | Singh et al. | |
| 2007/0082655 A1 | 4/2007 | Link et al. | |
| 2007/0167182 A1 | 7/2007 | Tenhunen et al. | |
| 2008/0003980 A1 | 1/2008 | Voss et al. | |
| 2008/0032682 A1 | 2/2008 | Jung et al. | |
| 2008/0064443 A1 | 3/2008 | Shin et al. | |
| 2008/0166993 A1 | 7/2008 | Gautier et al. | |
| 2008/0167027 A1 | 7/2008 | Gautier et al. | |
| 2008/0167036 A1 | 7/2008 | Bush et al. | |
| 2008/0222692 A1 * | 9/2008 | Andersson | G06F 21/33 |
| | | | 726/1 |
| 2008/0261561 A1 | 10/2008 | Gehrmann | |
| 2008/0318550 A1 | 12/2008 | DeAtley | |
| 2009/0061840 A1 | 3/2009 | Fleischman et al. | |
| 2009/0061934 A1 | 3/2009 | Hauck et al. | |
| 2009/0181662 A1 | 7/2009 | Fleischman et al. | |
| 2009/0205028 A1 | 8/2009 | Smeets et al. | |
| 2010/0029247 A1 * | 2/2010 | De Atley | H04W 8/265 |
| | | | 455/411 |
| 2010/0205288 A1 * | 8/2010 | Araujo | H04L 29/00 |
| | | | 709/223 |
| 2016/0366585 A1 | 12/2016 | Fleischman et al. | |

FOREIGN PATENT DOCUMENTS

| | | |
|---|---|---|
| EP | 1276339 A4 | 10/2003 |
| EP | 1679925 A1 | 7/2006 |
| EP | 1748661 A1 | 1/2007 |
| EP | 2079256 A1 | 7/2009 |
| EP | 2373074 A1 | 10/2011 |
| GB | 2428544 A | 1/2007 |
| JP | 2010532107 A | 9/2010 |
| WO | 1997042783 A1 | 11/1997 |
| WO | 2001015414 A1 | 3/2001 |
| WO | 2002058361 A2 | 7/2002 |
| WO | 2003041443 A1 | 5/2003 |
| WO | 2004057485 A1 | 7/2004 |
| WO | 2004082310 A1 | 9/2004 |
| WO | 2004105421 A2 | 12/2004 |
| WO | 2006054980 A1 | 5/2006 |
| WO | 2006084183 A1 | 8/2006 |
| WO | 2007079425 A2 | 7/2007 |
| WO | 2008086255 A2 | 7/2008 |
| WO | 2009002649 A2 | 12/2008 |
| WO | 2009032853 A1 | 3/2009 |

OTHER PUBLICATIONS

Chinese Application No. 200980108763.5—First Office Action dated Jan. 18, 2012.
Chinese Application No. 200980108763.5—Second Office Action dated Jan. 4, 2013.
Chinese Application No. 200980108763.5—Third Office Action dated Jun. 27, 2013.
Chinese Application No. 200980108763.5—Fourth Office Action dated Oct. 25, 2013.
PCT Patent Application No. PCT/US2008/009009—International Search Report and Written Opinion dated Nov. 17, 2008.
PCT Patent Application No. PCT/US2008/009007—International Search Report and Written Opinion dated Nov. 18, 2008.
PCT Patent Application No. PCT/US2008/009009—International Search Report and Written Opinion of the International Searching Authority, PCT Application Serial No. PCT/US2008/075138, Feb. 6, 2009, 16 pp.
PCT Patent Application No. PCT/US2009/031016—International Search Report and Written Opinion of the International Searching Authority, , May 27, 2009, 14 pp.
Invitation to Pay Fees and Partial International Search Report, dated Oct. 22, 2008, issued in International Application No. PCT/US2008/064971.
PCT Patent Application No. PCT/US2008/050343—International Search Report and Written Opinion, dated Jan. 5, 2009.

(56) References Cited

OTHER PUBLICATIONS

International Preliminary Report on Patentability, dated Jul. 7, 2009, issued in International Application No. PCT /US2008/050343.
European Extended Search Report, dated May 5, 2008, issued in European Application No. 08250050.5.
De Atley et al., Service Provider Activation, U.S. Appl. No. 11/849,286, filed Sep. 1, 2007.
International Preliminary Report on Patentability, dated Dec. 22, 2009, issued in International Application No. PCT /US2008/064971.
International Search Report and Written Opinion, dated Apr. 24, 2008, issued in International Application No. PCT / US2008/050340.
International Preliminary Report on Patentability, dated Jul. 16, 2009, issued in International Application No. PCT / US2008/050340.
European Search Report, dated Apr. 24, 2008, issued in European Application No. 08250053.
Authorized officer Athina Nickitas-Etienne, International Preliminary Report on Patentability in PCT/US20081/5138 dated Mar. 18, 2010, 10 pages.
Authorized officer Beate Giffo-Schmitt, International Preliminary Report on Patentability in PCT/US2009/31016 dated Jul. 29, 2010, 10 pages.
European Patent Application No. 16180672.4—European Search Report dated Oct. 25, 2016.
European Patent Application No. 16180672.4—First Communication Pursuant to Art 94(3) EPC dated May 28, 2019.
European Patent Application No. 16180672.4—Communication Pursuant to Art 94(3) EPC dated Feb. 11, 2020.

\* cited by examiner

| Activation Policy ID | 0 | 1 | 2 | 3 | 4 | 5 | 6 | 7 | 8 | 9 | 10 | 11 |
|---|---|---|---|---|---|---|---|---|---|---|---|---|
| Policy Description | Default policy | Carrier A retail policy | Country M service policy | Carrier B retail policy | Country N service policy | Carrier C retail policy | Country P service policy | Carrier D retail policy | Country Q service policy | Retail channel policy for country M | Retail channel policy for country N | Unlocked phone policy |
| Carriers | Configurable | Carrier A | Carrier A, B, or C | Carrier B | Carrier B or E | Carrier C | Carrier C | Carrier D | Carrier D | Carrier A, B, or C | Carrier B or E | Any |
| Country | Configurable | Country M | Country M | Country N | Country N | Country P | Country P | Country Q | Country Q | Country M | Country N | Any |

FIG. 12A

| IMEI | Serial Number | Initial Activation Policy ID | Shipped Activation Policy ID | Applied Activation Policy ID | Device Type | Inherits from IMEI | Description |
|---|---|---|---|---|---|---|---|
| 111111111111111 | 1ABCDEFG1 | 0 | 1 | 1 | Finished Goods | N/A | Device sold through carrier A retail and activated for carrier A |
| 111111111111112 | 1ABCDEFG2 | 0 | 4 | 3 | Service Replacement | 100000000000001 | Service device replaces and inherits activation records from carrier B retail device |
| 111111111111113 | 1ABCDEFG3 | 8 | 8 | 7 | Service Loaner | 100000000000002 | Service device on loan temporarily inherits activation records from carrier D retail device |
| 111111111111114 | 1ABCDEFG4 | 0 | 9 | 1 | Finished Goods | N/A | Device sold through retail channel in country M is locked to carrier A at activation time or at the point of sale |
| 111111111111115 | 1ABCDEFG5 | 0 | 3 | 11 | Finished Goods | N/A | Device sold through carrier B retail and authorized by carrier B to be unlocked from carrier B's network at activation time |

FIG. 12B

POSTPONED CARRIER CONFIGURATION

CROSS-REFERENCE TO RELATED APPLICATIONS

This application is a continuation of U.S. application Ser. No. 12/353,227, entitled "Postponed Carrier Configuration", filed Jan. 13, 2009, which claims benefit of U.S. Provisional Patent Application No. 61/021,025, filed Jan. 14, 2008, entitled "Postponed Carrier Configuration", each of which is incorporated by reference herein.

This application is related to U.S. patent application Ser. No. 11/849,286, filed Sep. 1, 2007, for "Service Provider Activation," and U.S. patent application Ser. No. 12/014,089, filed Jan. 14, 2008 for "Service Provider Activation with Subscriber Identity Module Policy," which patent applications are incorporated by reference herein.

TECHNICAL FIELD

The subject matter of this patent application is generally related to mobile devices.

BACKGROUND

Modern mobile devices can provide a number of telecommunications services, including telephony service, short messing service (SMS), and e-mail communication service. Conventional mobile devices with telephony applications are configured for a particular telecommunications carrier. Typically, both the software and the hardware of these mobile devices are configured for a particular carrier prior to activation of the mobile device. For example, carrier-specific configuration of the software requires separate software builds for each telecommunications carrier that will be supported by the mobile device, increasing the total development time of the mobile device with the addition of each carrier. Carrier-specific configuration of mobile device hardware occurs at the time the mobile device is manufactured. For example, radio boards in mobile devices are provisioned to only operate with smart cards associated with a particular telecommunications carrier. Device configuration at the manufacturing stage requires at least one factory line for each telecommunications carrier supported by the mobile device. In addition, a user of a conventional mobile device is limited to using the mobile device with the particular telecommunications carrier for which the mobile device was configured. If the user wishes to switch to a different telecommunications carrier, the user would need a separate mobile device specifically configured for the desired carrier.

SUMMARY

A technique, method, apparatus, and system are described to provide telecommunications carrier configuration at activation of a mobile device. In general in one aspect, a method is provided. The method includes receiving a request for activation of a mobile device, and during activation of the mobile device, determining for the mobile device a telecommunications carrier from a number of telecommunications carriers, and identifying information associated with the determined telecommunications carrier for configuring the mobile device.

Implementations can include the following feature. The method can further include, during activation of the mobile device, transmitting to the mobile device the identified information associated with the determined telecommunications carrier for configuring the mobile device.

In one aspect, a method is provided. The method includes transmitting a request for activation of a mobile device, and during activation of the mobile device, receiving information associated with a telecommunications carrier, and configuring the mobile device using the received information.

Implementations can include one or more of the following features. The mobile device can be a personal digital assistant, a cellular telephone, a smart phone, an EGPRS mobile phone, or a media player. Configuring the mobile device can include configuring a software stack of the mobile device or configuring a radio board of the mobile device. The mobile device can include a multi-touch-sensitive display.

In one aspect, a method is provided. The method includes receiving a request to reconfigure a mobile device that is configured based on a first telecommunications carrier, determining for the mobile device a second telecommunications carrier from a number of telecommunications carriers, and identifying information associated with the determined second telecommunications carrier for reconfiguring the mobile device.

Implementations can include one or more of the following features. The method can further include transmitting to the mobile device the identified information associated with the determined second telecommunications carrier for reconfiguring the mobile device. The request to reconfigure the mobile device can include an identifier for a smart card installed in the mobile device, and determining the second telecommunications carrier can include determining that the smart card identifier is associated with the second telecommunications carrier.

In one aspect, a method is provided. The method includes transmitting a request to reconfigure a mobile device that is configured based on a first telecommunications carrier, receiving information associated with a second telecommunications carrier, and reconfiguring the mobile device using the received information.

Implementations can include one or more of the following features. Reconfiguring the mobile device can include reconfiguring a software stack of the mobile device or reconfiguring one or more hardware components of the mobile device. The request to reconfigure can be transmitted in response to detecting that a first smart card installed in the mobile device is replaced with a second smart card. The method can further include notifying one or more applications on the mobile device of the replacement of the first smart card with the second smart card. The method can further include reconfiguring one or more applications on the mobile device based on the received information associated with the second telecommunications carrier.

In one aspect, a system is provided. The system includes an access device, and a mobile device coupled to the access device, wherein the mobile device is configured to transmit to the access device a request for activation of the mobile device, and during activation of the mobile device, receive from the access device information associated with a first telecommunications carrier, and configure the mobile device using the received information associated with the first telecommunications carrier.

Implementations can include one or more of the following features. The access device can be configured to receive from the mobile device the request for activation of the mobile device, and during activation of the mobile device, determine for the mobile device the first telecommunications carrier from a number of telecommunications carriers, identify information associated with the first telecommunications carrier for configuring the mobile device, and transmit to the mobile device the information associated with the first telecommunications carrier for configuring the mobile device. The information associated with the first telecommunications carrier can indicate or include one or more settings for the first telecommunications carrier which should be enabled on the mobile device. The request for activation of the mobile device can include an identifier for the mobile device and an identifier for a first smart card installed in the mobile device, and the first telecommunications carrier can be associated with the identifier for the first smart card.

Implementations can include one or more of the following features. The mobile device can be further configured to detect when the first smart card installed in the mobile device is replaced with a second smart card, and in response to the detected replacement of the first smart card with the second smart card, transmit to the access device a request to reconfigure the mobile device. The access device can be further configured to receive from the mobile device the request to reconfigure the mobile device, determine for the mobile device a second telecommunications carrier from the number of telecommunications carriers, identify information associated with the second telecommunications carrier for reconfiguring the mobile device, and transmit to the mobile device the information associated with the second telecommunications carrier for reconfiguring the mobile device. The mobile device can be further configured to receive the information associated with the second telecommunications carrier, and reconfigure the mobile device using the received information associated with the second telecommunications carrier. Reconfiguring the mobile device can further include reconfiguring one or more hardware components or a software stack of the mobile device. The mobile device can include a multi-touch-sensitive display.

In one aspect, a method is provided. The method includes determining an activation policy for activation of a mobile device using manufacturing information associated with the mobile device and distribution information associated with the mobile device, and applying the activation policy during activation of the mobile device.

Implementations can include one or more of the following features. The manufacturing information associated with the mobile device can include one or more identifiers of the mobile device. The one or more identifiers of the mobile device can include an International Mobile Equipment Identity. The distribution information associated with the mobile device can include information about a distribution channel for the mobile device. The distribution information associated with the mobile device can include information about distribution of the mobile device for use as a loaner mobile device or a replacement mobile device. Determining the activation policy can include determining the activation policy of a mobile device that will be replaced by the loaner mobile device or the replacement mobile device. Determining the activation policy can include determining the activation policy from a plurality of activation policies associated with a distribution channel for the mobile device. A smart card installed in the mobile device can have at least one identifier associated with a telecommunications carrier, and the method can include using the at least one identifier associated with the telecommunications carrier to determine the activation policy from the plurality of activation policies. Each activation policy in the plurality of activation policies can be associated with at least one telecommunications carrier in a plurality of telecommunications carriers. Each activation policy in the plurality of activation policies can be associated with a country. Applying the activation policy during activation of the mobile device can further include generating an activation record for the mobile device using the determined activation policy. The activation record can require that a smart card installed in the mobile device has an identifier associated with a particular telecommunications carrier. The activation record can allow a smart card installed in the mobile device to have an identifier associated with any of a plurality of telecommunications carriers.

In one aspect, a method is provided. The method includes, for a mobile device with a first version of a configuration bundle, determining that a second version of the configuration bundle is available, the second version being a later version than the first version, and reconfiguring the mobile device using the second version of the configuration bundle after activation of the mobile device.

Implementations can include one or more of the following features. Reconfiguring the mobile device can include downloading the second version of the configuration bundle to local cache on the mobile device. The configuration bundle can be associated with a particular telecommunications carrier. The configuration bundle can authorize the mobile device to use third party applications with the particular telecommunications carrier. Determining that the second version of the configuration bundle is available can further include comparing a version number of the first version of the configuration bundle with a version number of the second version of the configuration bundle, and if the version number of the second version is later than the version number of the first version, initiating an update process. A smart card installed in the mobile device can have an identifier associated with the particular telecommunications carrier, and determining that the second version of the configuration bundle is available can include identifying the configuration bundle of the mobile device using the identifier of the smart card. The configuration bundle can be localized using a country code included in the identifier of the smart card. The identifier of the smart card can be associated with an enterprise, and the configuration bundle of the mobile device can be specific to the enterprise.

In one aspect, a system is provided. The system includes an access device, and a mobile device coupled to the access device, the mobile device having a first version of a configuration bundle, wherein the mobile device is configured to, after activation of the mobile device, receive from the access device a second version of the configuration bundle, and reconfigure the mobile device using the second version of the configuration bundle. The mobile device can include a multi-touch-sensitive display.

Particular embodiments of the subject matter described in this specification can be implemented to realize one or more of the following advantages. Differentiation of mobile devices for particular telecommunications carriers can be postponed until the activation stage. Generic software is used to configure mobile devices for any number of telecommunication carriers in any number of countries, reducing total software development time. Generic hardware on a mobile device reduces the need for customization and differentiated inventory at the manufacturer. The generic software and hardware can self-configure for a particular telecommunications carrier when the mobile device is activated.

DESCRIPTION OF DRAWINGS

FIG. 12A illustrates an example table of activation policies.

FIG. 12B illustrates an example table of information stored in a device information repository.

DETAILED DESCRIPTION

Example Mobile Device

Figure 1A:
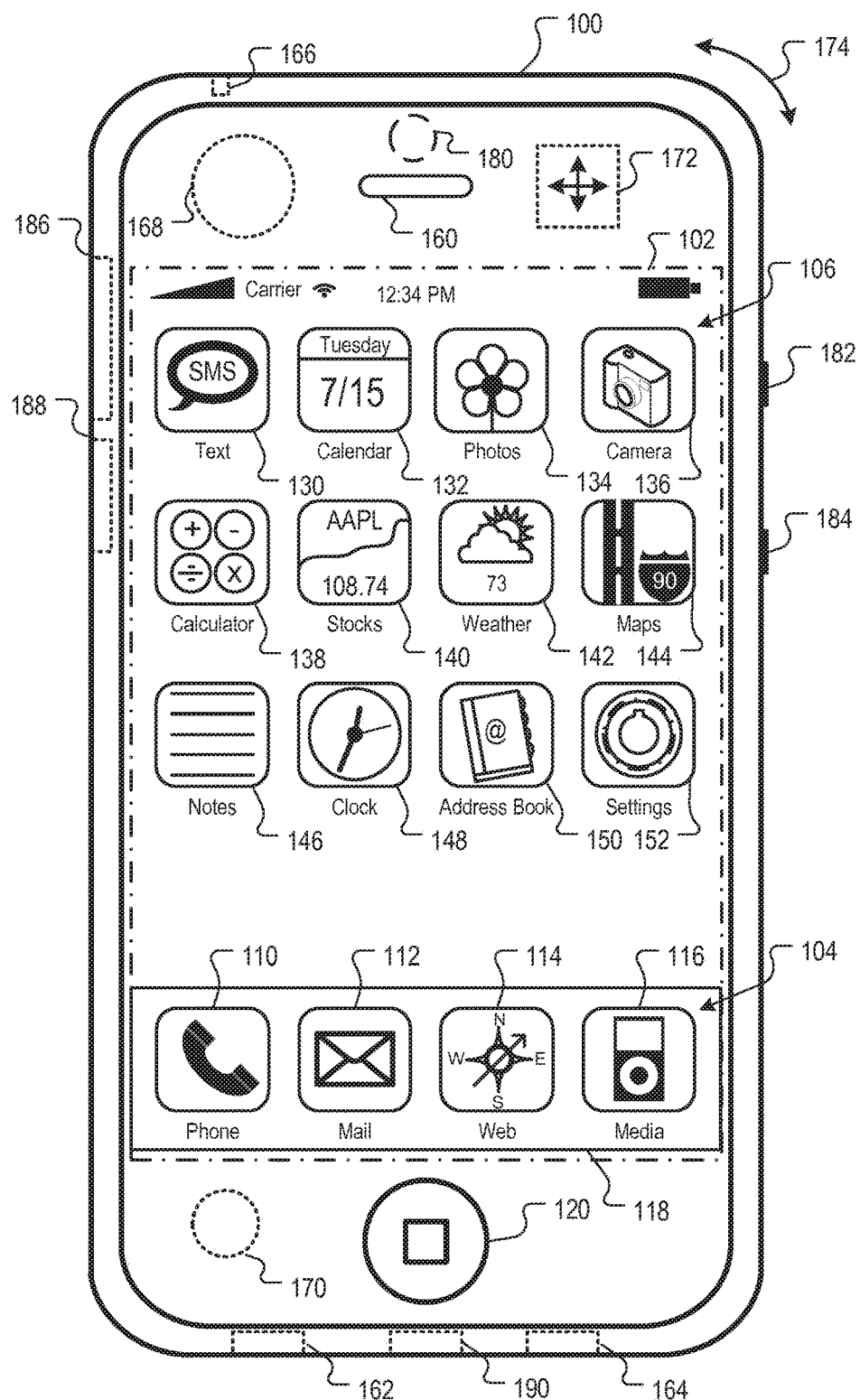
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323, 846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), general packet radio service (GPRS), Enhanced Data GSM Environment (EDGE), etc.

Example Mobile Device

Figure 1B:
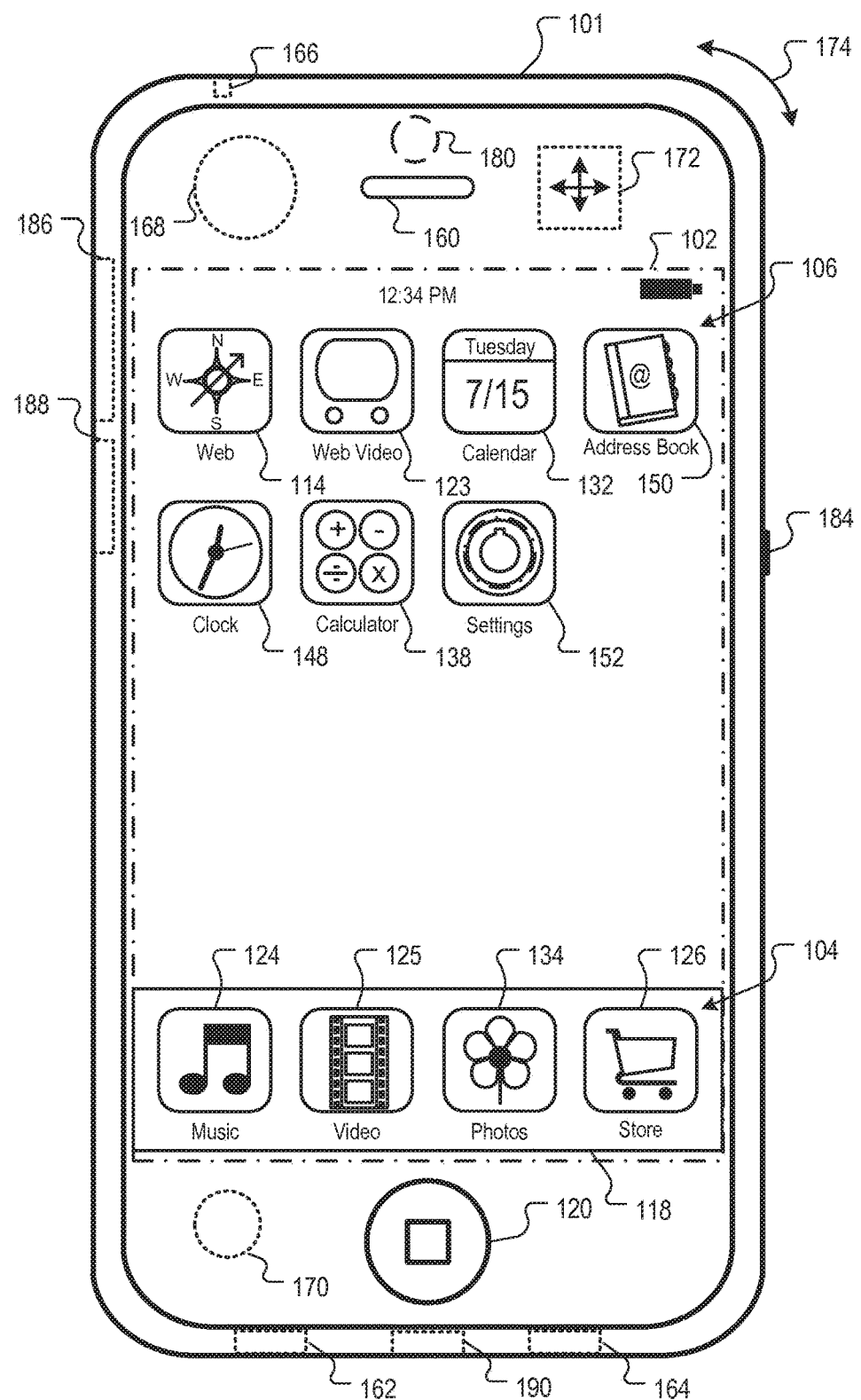
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
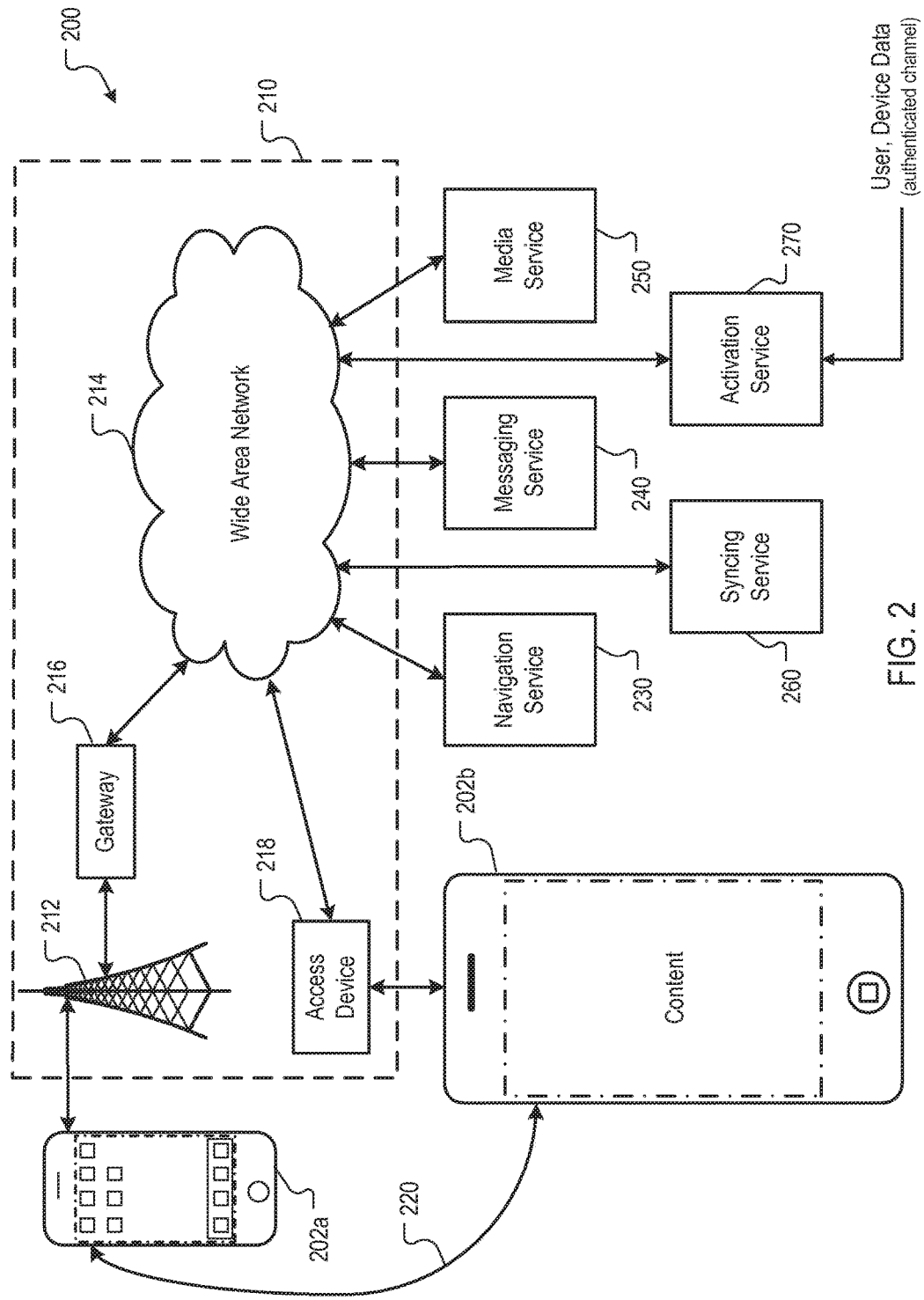
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
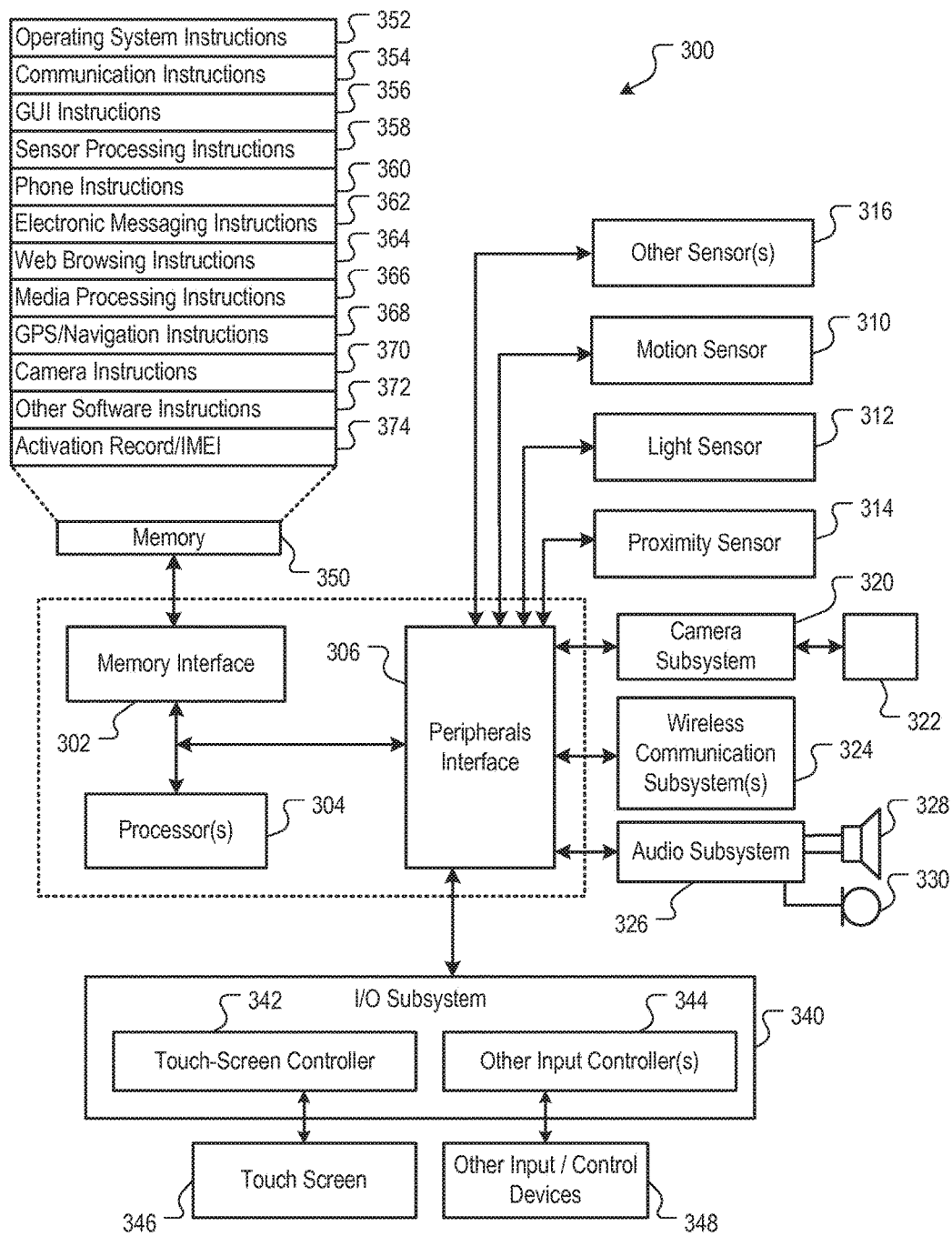
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation ticket or record and an International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
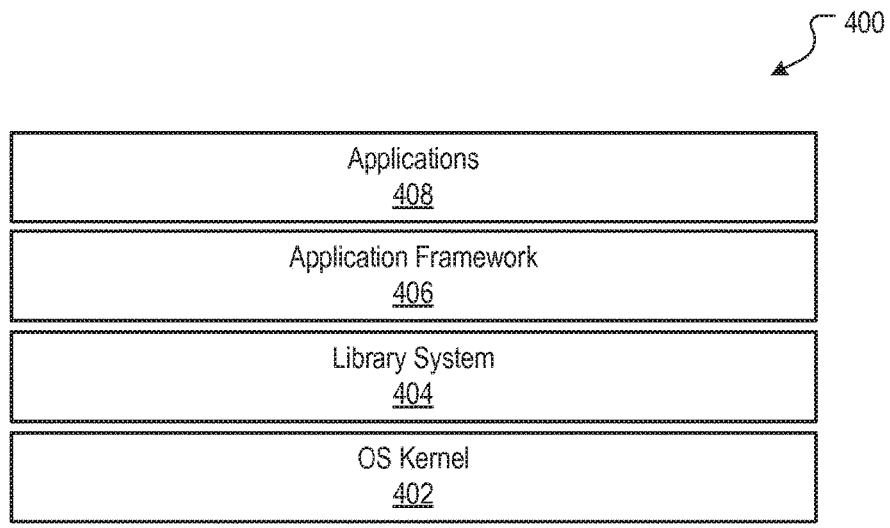
FIG. 4A illustrates an example implementation of a software stack for the mobile devices of FIGS. 1A-1B.

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406, and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services for applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
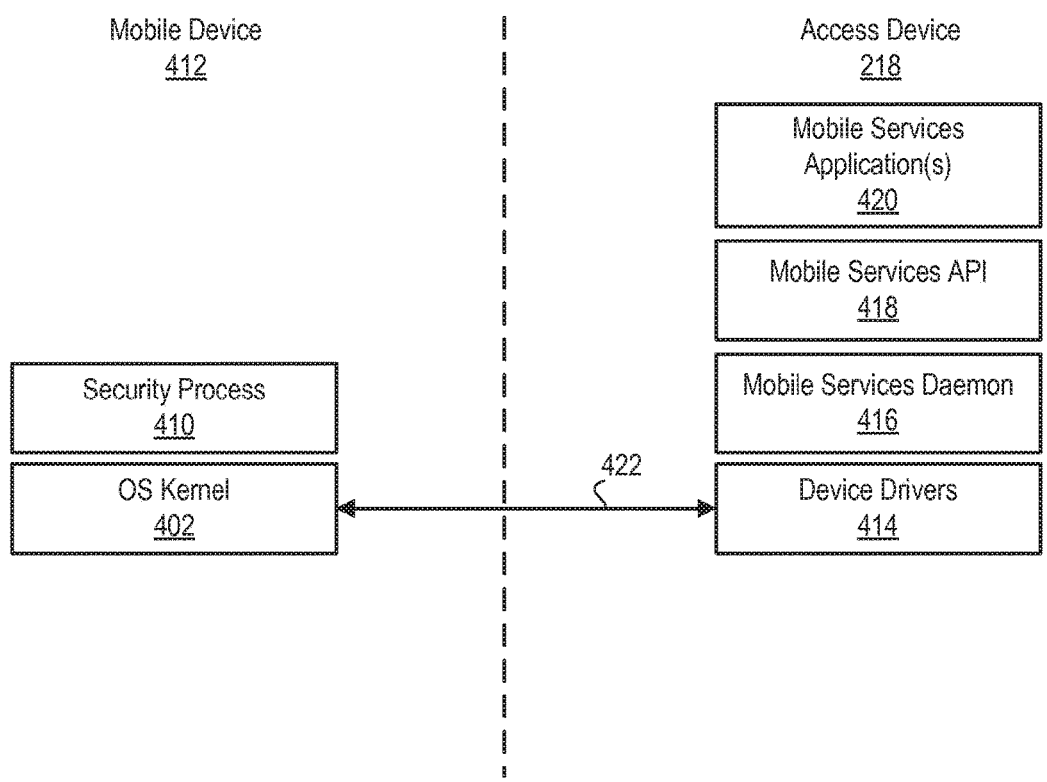
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418, and one or more mobile service applications 420. The device drivers 414 are responsible for implementing the transport layer protocol such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables, and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In other implementations, the mobile device 412 and access device 218 include wireless transceivers for establishing a wireless link (e.g., Wi-Fi). The drivers 414 and kernel 402 detect the connection and alert the security process 410 and mobile services daemon 416 of the connection status. Once the connection is established, certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Example Scenarios for Carrier Configuration at Activation

Figure 5:
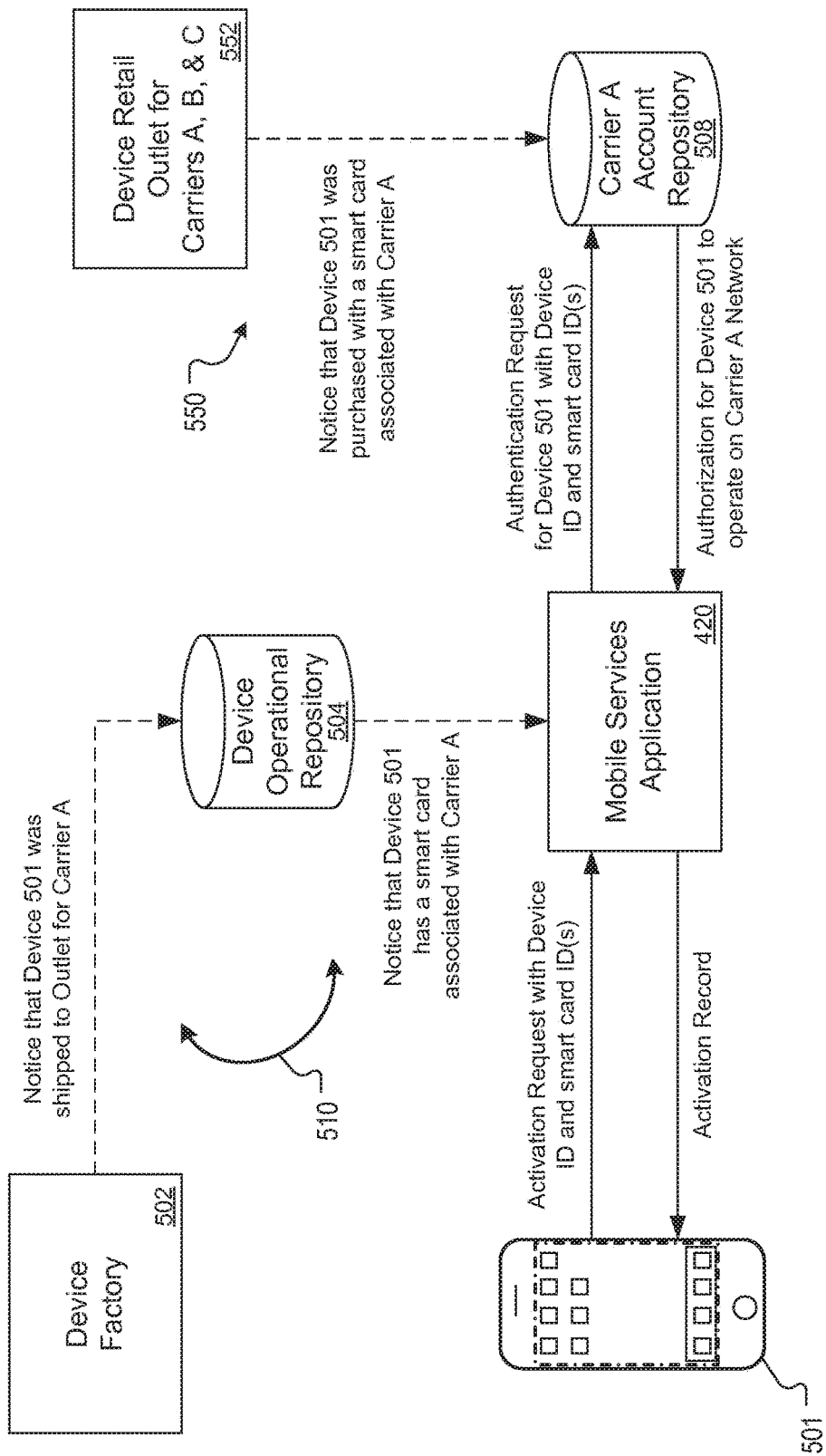
FIG. 5 illustrates two example scenarios for carrier configuration at activation for a mobile device.

FIG. 5 illustrates two example scenarios 510 and 550 for carrier configuration at activation for a mobile device (e.g., the mobile devices 100 and 101 of FIGS. 1A-1B, respectively). The mobile device 501 includes generic software which allows the mobile device 501 to self-configure for a particular telecommunications carrier, e.g., Carrier A, at the time the mobile device 501 is activated.

The mobile device 501 and possibly other similar mobile devices are manufactured at device factory 502. Unlike conventional mobile devices, the mobile device 501 is not manufactured with carrier-specific software. Configuration of generic software on the mobile device 501 for any of a number of telecommunications carriers can be postponed to a point after the mobile device 501 has been manufactured. For example, if Carriers A, B, and C can be supported by the mobile device 501, the mobile device 501 produced by the device factory 502 will have generic software which can be configured for Carrier A, Carrier B, or Carrier C when the mobile device 501 is activated, as will be described in more detail below.

In some implementations, if Carriers A, B, and C will be supported, the generic software can include a set of carrier-specific settings or default values for each of Carriers A, B, and C. In some implementations, the generic software does not include carrier-specific settings for any telecommunications carrier. In this implementation, when a user purchases the mobile device 501, carrier-specific settings for a particular telecommunications carrier selected by the user can be provided to/accessed by the mobile device 501 upon activation.

In some implementations, the mobile device 501 is manufactured with carrier-specific hardware. Communications hardware components (e.g., components in wireless communication subsystem 324 of FIG. 3) in a mobile device can be provisioned to only work with memory devices (e.g., smart cards) or integrated circuit cards (ICC) associated with a particular telecommunications carrier. Generally, memory devices (hereinafter referred to generically as "smartcards") can be used to allow users to change mobile devices. A smart card can include personal as well as system configuration information. Removing the smart card from one mobile device and inserting the smart card into another mobile device allows a user to easily change mobile devices. As described above, some smart cards can store carrier specific information used to authenticate and identify subscribers on the carrier network. Examples of a smart card for the mobile device 501 can include a Subscriber Identity Module (SIM), a Universal Integrated Circuit Card (UICC), and a Removable User Identity Module (RUIM). A smart card for mobile devices can have a serial number (e.g., an International Circuit Card ID (ICCID), an International Mobile Subscriber Identity (IMSI), an Authentication Key (Ki), or a Local Area Identity (LAI)) which uniquely identifies the smart card. Typically, the unique serial number can also identify a particular country and/or a particular telecommunications carrier associated with the smart card. In one example, radio boards in conventional mobile devices are provisioned to only operate with SIM cards with an ICCID and/or an IMSI that identifies a particular telecommunications carrier. In effect, a radio board can be "locked" to a particular telecommunications carrier.

In some implementations, the mobile device 501 is manufactured with generic hardware. That is, communications hardware components (e.g., components in wireless communication subsystem 324 of FIG. 3) in the mobile device can be manufactured to work with a smart card or ICC associated with any of a number of telecommunications carriers. The communications hardware components are not "locked" to any particular telecommunications carrier. For example, a radio board in the mobile device 501 can be provisioned to operate with SIM cards with an ICCID and/or an IMSI that is associated with any of the telecommunications carriers supported by the mobile device 501. In some implementations, the radio board in the mobile device 501 can be manufactured to operate with any smart card for a given communication protocol, regardless of the particular telecommunications carrier associated with the smart card. In other implementations, the generic hardware of the mobile device 501 will not operate with any smart card (e.g., a SIM card) from any telecommunications carrier until the mobile device 501 is activated. In these implementations, the mobile device 501 can be configured for a specific telecommunications carrier at the time of activation.

In the first example scenario 510, the mobile device 501 is manufactured in device factory 502 and shipped for consumer sale to a retail outlet for Carrier A. A notice that the mobile device 501 was shipped to a Carrier A outlet is sent to a device operational repository 504. The device operational repository 504 can be, for example, a database that stores information about the mobile device 501 and other devices. In some implementations, the information associated with the mobile device 501 can be indexed in the device operational repository 504 by an identifier for the mobile device 501. For example, the mobile device 501 can be uniquely identified by a serial number or an identifier, e.g., an IMEI 374 stored in the device memory 350 in FIG. 3. A unique identifier for the mobile device 501, which can be included in the notice from the device factory 502, can be further included in a message concerning the mobile device 501 sent from the device operational repository 504.

Typically, when a device is shipped for consumer sale to an outlet for a particular telecommunications carrier, the carrier will only offer to sell the device for use on the particular carrier's telecommunications network. For example, a user who purchases the mobile device 501 at the Carrier A outlet will generally receive a smart card associated with Carrier A for use with the mobile device 501. Consequently, the device operational repository 504 can store information that associates the mobile device 501 with a smart card (or the particular smart card) associated with Carrier A. This information can be used to determine the carrier-specific capabilities (e.g., wireless network service within range of certain wireless access points) of the mobile device 501 and on which network (e.g., the Carrier A network) the mobile device 501 will operate.

The device operational repository 504 can forward information associated with the mobile device 501 to a mobile services application 420. In the first example scenario 510, the device operational repository 504 sends a notice to the mobile services application 420 indicating that the mobile device 501 has installed a removable smart card that is associated with Carrier A. The notice can include, for example, an identifier for the mobile device 501 (e.g., an IMEI) and one or more identifiers for the smart card (e.g., an ICCID and/or an IMSI).

In the first example scenario 510, after the user purchases the mobile device 501 from the Carrier A outlet and the smart card associated with Carrier A is installed in the mobile device 501, the user can activate the mobile device 501 by, for example, connecting the mobile device 501 to an access device (e.g., access device 218 of FIGS. 2 and 4B) to access a mobile services application 420. The mobile device 501 can be connected (e.g., tethered) to an access device by a physical connection (e.g., a cable connected to USB ports) or through a wireless link (e.g., Wi-Fi). In some implementations, after a secure session (e.g., an SSL session) is established between the mobile device 501 and the access device (e.g., a personal computer), the mobile services application 420 (e.g., the iTunes™ client) is automatically invoked and directs the user to an activation service (e.g., activation service 270 of FIG. 2) for the mobile device 501. Early in the activation process, the mobile device 501 can send (e.g., automatically) an activation request to the mobile services application 420. In some implementations, the activation request includes both a unique identifier (e.g., an IMEI) for the mobile device 501 and one or more unique identifiers (e.g., an ICCID and/or an IMSI) for the installed smart card.

In some implementations, the user is required to create an account through the mobile services application 420 before the user is provided with one or more remote services provided by one or more remote service providers (e.g., carrier services, content portals, or websites). After a user account is established through the mobile services application 420, the user can create one or more accounts with the individual remote service providers (e.g., Carrier A).

The mobile services application 420 sends an authentication request for mobile device 501 to an activation service that includes Carrier A account repository 508. The authentication request can include information received from the mobile device 501 in the activation request. For example, the authentication request can include the unique identifier for the mobile device 501 and the unique identifier for the smart card. In some implementations, the authentication request includes further information, e.g., information received from the device operational repository 504.

In some implementations, the activation service maintains a relational database or registry (e.g., MySQL™) of user information, ICCID, IMSI, IMELI, and any other information needed to authenticate a user and to provide activation services. In some implementations, Carrier A account repository 508 is part of this activation service database or registry. Using the database or registry, the activation service knows, for example, that a particular mobile device (e.g., mobile device 501) with a particular IMEI, with a particular SIM card was purchased by a particular user on a particular date, and that a particular carrier (e.g., Carrier A) is providing one or more services to the user, and the activation date of those services.

In some implementations, the foregoing information known by the activation service can be compared with the information received in the authentication request from the mobile services application 420, for purposes of authenticating the user to ensure that the user requesting the activation service is the true owner of the mobile device 501 and/or an authorized subscriber of Carrier A's telecommunications services.

If the information included in the authentication request matches the information associated with the mobile device 501 in the Carrier A Account Repository 508, the activation service can transmit an authorization for device 501 to the mobile services application 420. The authorization can allow the user access to one or more telecommunications services using the Carrier A network.

The activation service can generate an activation ticket or record specific to the mobile device 501, which can be sent to the mobile device 501 from the mobile services application 420. In some implementations, the activation ticket or record can include the unique identifiers for the mobile device 501 and the smart card. The activation ticket or record can be used by the mobile device 501 to complete the activation process, for example, by verifying that the identifiers in the activation ticket or record match the identifiers for the mobile device 501 and the installed smart card.

During the activation process, information regarding the carrier is exchanged between the mobile device 501 and the mobile services application 420, and the mobile device 501 is configured accordingly. For example, the mobile device 501 can receive data from the mobile services application 420 that specifies how generic software stored therein should be configured for the particular telecommunications carrier associated with the smart card. The received data can specify that the set of carrier-specific settings or default values associated with the particular telecommunications carrier (e.g., Carrier A) should be enabled, while the sets of carrier-specific settings or default values for all other supported telecommunications carriers should be disabled.

In some implementations, if the carrier-specific settings are later cleared from the mobile device 501 (e.g., the mobile device 501 is deactivated and device functionality is locked), the user can re-activate the mobile device 501 by, for example, repeating the activation process in the same general manner as described above. The mobile services application 420 or the activation service can recognize that the mobile device 501 has already been activated with the same smart card (e.g., by verifying the IMEI and the ICCID and/or the IMSI with information in the relational database). In some implementations, when the identifiers are verified, the mobile services application 420 can send the mobile device 501 data (e.g., the set of carrier-specific settings) to enable the mobile device 501 to self-configure, for a second time, for the particular telecommunications carrier.

In some implementations, one or more carrier-specific settings are sent to the mobile device 501 during or just after activation. These carrier-specific settings can be pushed from the mobile services application 420 to the mobile device 501 or pulled by the mobile device 501 using the wired and/or wireless networks 210 (FIG. 2). For example, if the generic software on the mobile device 501 includes a set of carrier-specific settings for each of Carriers A, B, and C, and the user installs a smart card associated with Carrier D, the set of carrier-specific settings for Carrier D can be sent to the mobile device 501 during activation. The generic software on the mobile device 501 can then self-configure for Carrier D, for example, by enabling the received set of Carrier D-specific settings and disabling the sets of settings specific to Carriers A, B, and C.

In some implementations, when the radio board is not provisioned for a particular telecommunications carrier when the mobile device 501 is manufactured, the radio board is configured at activation for the telecommunications carrier associated with the smart card installed in the mobile device 501. For example, the radio board can be provisioned at activation to only work with the smart card (e.g., as identified by an ICCID) presently installed in the mobile device 501. In effect, this provides a lock on the radio board and, consequently, a lock on the mobile device 501 until the mobile device 501 is re-activated with a different smart card, as described in more detail below.

In the second example scenario 550, the mobile device 501 is manufactured in the device factory 502 and shipped for consumer sale to a device retail outlet for Carriers A, B, and C 552. Unlike the Carrier A outlet of example scenario 510, the device retail outlet for Carriers A, B, and C 552 might offer to sell the mobile device 501 for use on any of Carrier A's network, Carrier B's network, and Carrier C's network. In the present example, the user of the mobile device 501 purchases the mobile device 501 for use on Carrier A's network, e.g., by purchasing the mobile device 501 with a smart card associated with Carrier A. In another scenario, the user purchases the mobile device 501 with a smart card associated with a different telecommunications carrier (e.g., Carrier B or Carrier C), and the mobile device 501 is later configured at activation for the chosen carrier.

A notice that the mobile device 501 was purchased with a smart card associated with Carrier A is sent from the device retail outlet for Carriers A, B, and C 552 to the Carrier A Account Repository 508. In some implementations, a unique identifier (e.g., an IMEI) for the mobile device 501 and one or more unique identifiers (e.g., an ICCID and/or an IMSI) for the smart card can be included in the notice from the device retail outlet for Carriers A, B, and C 552.

After the user purchases the mobile device 501 from the device retail outlet for Carriers A, B, and C 552 and the smart card associated with Carrier A is installed in the mobile device 501, the user can activate the mobile device 501 in the second example scenario 550 in the same general manner as described above with respect to the first example scenario 510.

Carrier-Specific Settings for Configuration

Configuration of the mobile device 501 using the carrier-specific settings can include configuring a number of telecommunications applications. For example, if Carrier A will provide voicemail, e-mail, or other data services to the mobile device 501 (e.g., using EDGE or GPRS communications protocol), the applications residing on the mobile device 501 to support these services will be configured at activation using the carrier-specific settings.

Different telecommunications carriers may have one or more different wireless access points providing wireless network access (e.g., Wi-Fi) in certain locations, e.g., airports, public buildings, hotels, restaurants, and retail outlets. In some implementations, the mobile device 501 can be configured using the carrier-specific settings to automatically connect to a network when the mobile device 501 is within the coverage range of these wireless access points. Some telecommunications carriers vary the services supported or features of supported services depending on where (e.g., a home zone) a mobile device 501 is presently located. In some implementations, the mobile device 501 can be configured using the carrier-specific settings to automatically enable zone-specific features or services when the mobile device 501 is located in a particular zone.

In some implementations, carrier-specific settings are used to configure the way a mobile device 501 displays carrier account information to the user. For example, subscriber account information (e.g., account bill balance, number of minutes remaining, etc.) can be accessed by navigating one or more menus (e.g., for settings, phone, carrier service, etc.) on the mobile device 501. The presentation of account information can vary based on the telecommunications carrier and the specific set of supported services purchased by the user. In some implementations, one or more of the carrier-specific settings can be manually modified by the user, for example, by changing preference settings or navigating the one or more menus to access the subscriber account information on the mobile device 501.

In some implementations, configuration of the mobile device 501 includes using the carrier-specific settings to configure certain settings or defaults for other applications on the mobile device 501. In one example, carrier-specific configuration can include setting one or more bookmarks (e.g., for the telecommunications carrier's main web page) for the web browsing application, accessible by selection of the Web object 114 (FIGS. 1A-1B). In another example, one or more default stocks (e.g., the telecommunications carrier's stock) can be configured for display when the user accesses a stock quote application, for example, by selecting the stocks object 140 (FIG. 1A). In a third example, a default home page (e.g., the telecommunications carrier's services web page) can be configured for display when the user accesses an online shopping application, for example, by selecting the store object 126 (FIG. 1B).

In some implementations, the carrier-specific settings can include settings specific to the country or region in which the mobile device 501 will be operated. For example, different countries may support service for TDD/TTY (Telecommunications Device for the Deaf/teletypewriter) using different TTY protocols. In another example, different countries may have different limits on the volume level of audio output from a speaker of a mobile telephony device. In some implementations, when the mobile device 501 is configured at activation, the mobile device 501 is automatically configured with country-specific or region-specific settings, which are included in the carrier-specific settings. In some implementations, in addition to software configuration control as described above, hardware configuration (e.g., radio power levels, audio output levels, etc.) can also be controlled at activation.

Example Carrier Determination Process

Figure 6:
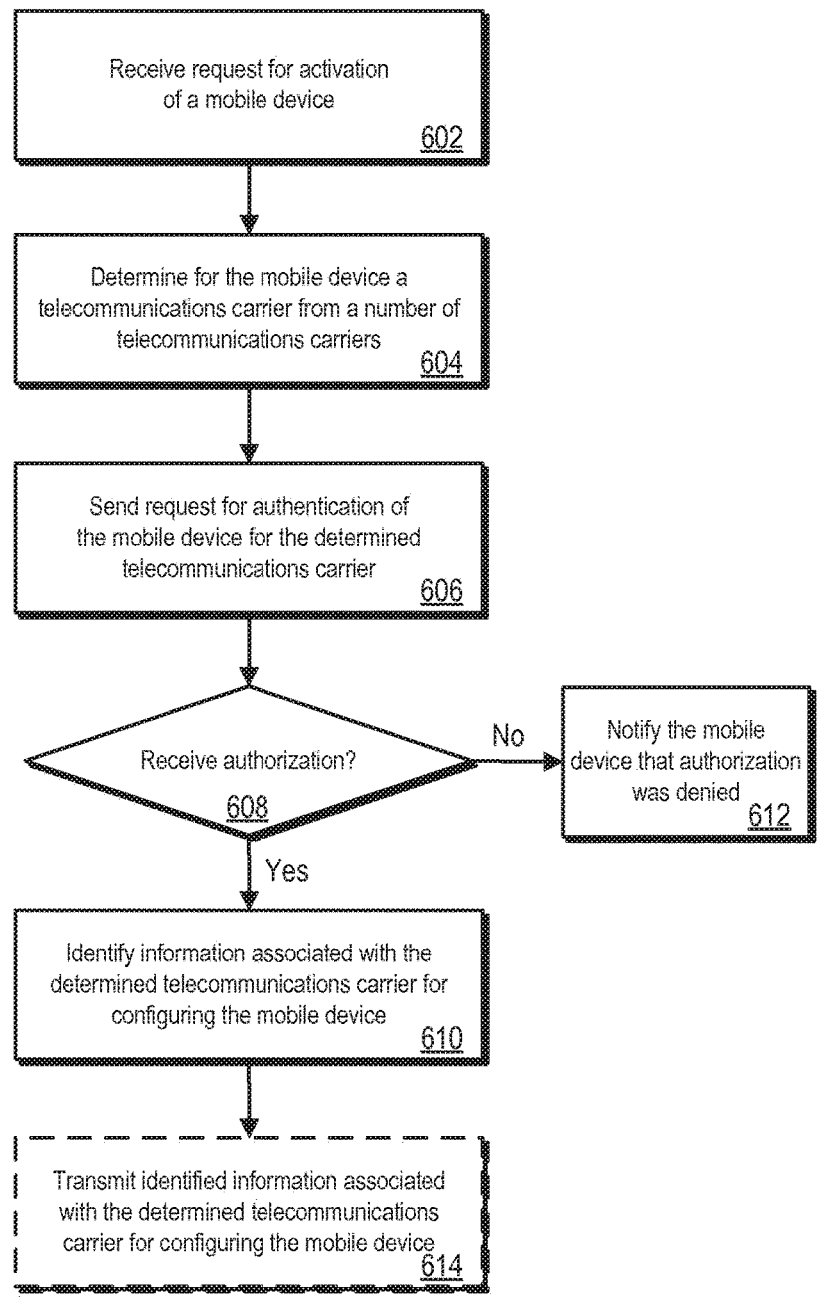
FIG. 6 is a flow diagram of an example carrier determination process for an access device.

FIG. 6 is a flow diagram of an example carrier determination process 600 for an access device. The process 600 begins when the access device receives a request for activation of a mobile device (602). For example, the access device 218 of FIG. 4B can receive the activation request from mobile device 412 of FIG. 4B through a physical connection (e.g., a cable) or through a wireless link.

During the activation process for the mobile device, the access device can determine for the mobile device a telecommunications carrier from a number of telecommunications carriers (604). For example, if the mobile device 501 (FIG. 5) was purchased from a device retail outlet for Carriers A, B, & C 552 (FIG. 5), the access device can determine that the mobile device 501 will operate on telecommunications Carrier A's network, for example, based on the smart card received by the user for use with the mobile device 501.

A request is sent for authentication of the mobile device for use on the network of the determined telecommunications carrier (606). In some implementations, the request is sent from a mobile services application 420 (FIGS. 4B and 5) running on the access device. The authentication request can be sent to an activation service or to the determined telecommunications carrier. In some implementations, the activation service receiving the authentication request is specific to the determined telecommunications carrier. In other implementations, the activation service receiving the authentication request is a generic activation service for multiple telecommunications carriers.

During activation of the mobile device, if authorization is not received for the mobile device to operate on the determined telecommunications carrier's network ("No" branch of decision 608), the mobile device can be notified that the authorization was denied (612). In some implementations, the carrier determination process 600 can then be terminated and/or other action can be taken (e.g., automatically restarting the process 600).

During activation of the mobile device, if authorization is received for the mobile device to operate on the determined telecommunications carrier's network ("Yes" branch of decision 608), the process 600 can continue with the identification of information associated with the determined telecommunications carrier for configuring the mobile device (610). In some implementations, the identified information indicates that the set of carrier-specific settings for the determined telecommunications carrier should be enabled and/or the sets of settings specific to other telecommunications carriers should be disabled. In other implementations, the identified information includes carrier-specific settings or default values for the determined telecommunications carrier. In some implementations, the identified information associated with the determined telecommunications carrier is transmitted to the mobile device for configuring the mobile device (614).

Example Carrier Configuration Process

Figure 7:
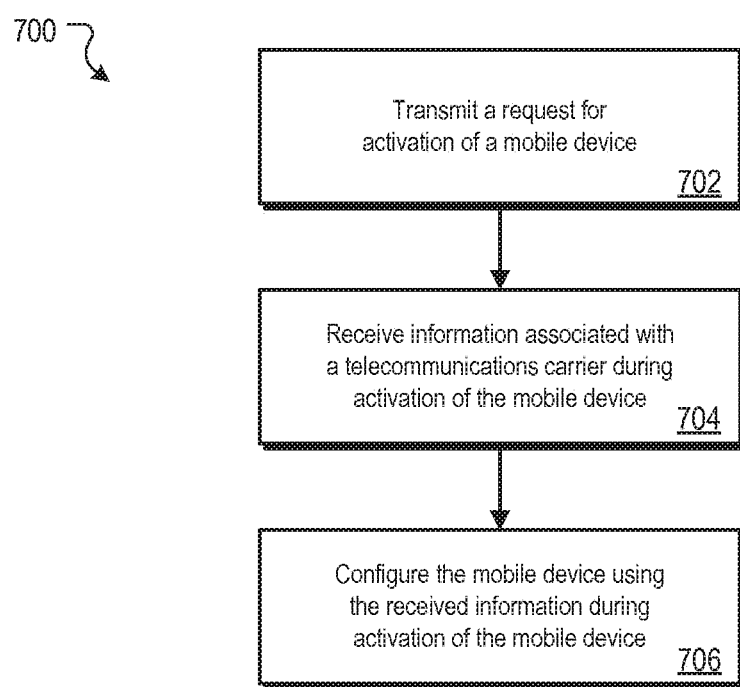
FIG. 7 is a flow diagram of an example carrier configuration process for a mobile device.

FIG. 7 is a flow diagram of an example carrier configuration process 700 for a mobile device (e.g., the mobile devices 100 and 101 of FIGS. 1A-1B, respectively). The process 700 begins when the mobile device transmits a request for activation of the mobile device (702). For example, the activation request can be sent from the mobile device 412 (FIG. 4B) to the access device 218 (FIG. 4B) through a physical connection or a wireless link. In some implementations, the activation request includes a unique identifier (e.g., an IMEI) for the mobile device and one or more unique identifiers (e.g., an ICCID and/or an IMSI) for a removable smart card installed in the mobile device.

During the activation process for the mobile device, the mobile device can receive information associated with a telecommunications carrier (704). In some implementations, the received information indicates which set of carrier-specific settings existing on the mobile device should be enabled and/or which sets should be disabled. In other implementations, the transmitted information includes carrier-specific settings or default values for the particular telecommunications carrier that will provide one or more services to the mobile device.

During the activation process for the mobile device, the mobile device can use the received information to self-configure (706). In some implementations, configuring the mobile device includes configuring a software stack (e.g., software stack 400 of FIG. 4A) of the mobile device. In some implementations, configuring the mobile device includes configuring a radio board or other hardware components in the mobile device. In some implementations, the self-configuring mobile device is a personal digital assistant, a cellular telephone, a smart phone, an EGPRS mobile phone, or a media player. In some implementations, the self-configuring mobile device includes a multi-touch-sensitive display.

Example Carrier Determination Process

Figure 8:
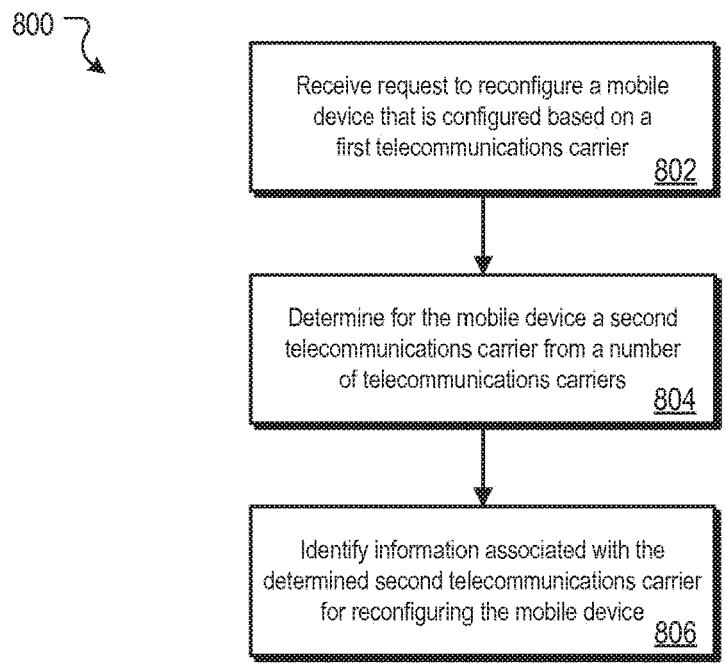
FIG. 8 is a flow diagram of an example carrier determination process for an access device.

FIG. 8 is a flow diagram of an example carrier determination process 800 for an access device. The process 800 begins when the access device receives a request to (re-)configure a mobile device that is presently configured based on a first telecommunications carrier (802). For example, the request can be received from a mobile device which has already been activated and configured for use on a first telecommunications carrier's network. In some implementations, the reconfiguration request includes a unique identifier for the mobile device and a unique identifier for the smart card.

In some implementations, the request to reconfigure a mobile device can occur as part of re-activation or a repeated activation process for the mobile device. For example, if the mobile device has been activated and configured with a first smart card (e.g., with a first unique smart card identifier), if the user removes the first smart card from the mobile device and replaces it with a second smart card (e.g., with a second unique smart card identifier), a security process (e.g., security process 410 of the mobile device 412 of FIG. 4B) can detect the change in the installed smart card and can initiate an action, such as starting a new activation process.

In some scenarios, the first smart card associated with the first telecommunications carrier is replaced with a second smart card associated with the first telecommunications carrier. For example, the second smart card can be owned by a second user who is borrowing the mobile device from the owner of the mobile device. In some implementations, when smart cards associated with the same carrier are switched, the mobile device software can be reconfigured with carrier-specific settings associated with the second user.

In some scenarios, the user replaces the first smart card associated with the first telecommunications carrier with a second smart card associated with a second telecommunications carrier. This "hot swapping" of smart cards may occur while the mobile device is turned on. In some implementations, when the mobile device is manufactured with generic hardware (e.g., a radio board) that is not configured specifically for a particular telecommunications carrier, the mobile device is capable of reconfiguring the hardware that was previously configured during the last activation process. That is, if the generic hardware of the mobile device was configured for the first telecommunications carrier during the first activation process, the mobile device can reconfigure the hardware for the second telecommunications carrier during a subsequent activation process, following the swapping of the smart cards.

Returning to the process 800, a second telecommunications carrier can be determined from a number of telecommunications carriers for the mobile device (804). For example, the second telecommunications carrier can be determined by identifying the telecommunications carrier associated with the replacement smart card, using the unique identifier of the replacement smart card.

Information associated with the determined second telecommunications carrier can be identified for reconfiguring the mobile device (806). In some implementations, the identified information indicates that the set of carrier-specific settings for the first telecommunications carrier should be disabled and the set of carrier-specific settings for the determined second telecommunications carrier should be enabled. In other implementations, the identified information includes carrier-specific settings or default values for the determined second telecommunications carrier. In some implementations, the identified information associated with the determined second telecommunications carrier is transmitted to the mobile device for reconfiguring the mobile device. In some implementations, the carrier determination process can be a process that is independent of the activation process.

Example Carrier Reconfiguration Process

Figure 9:
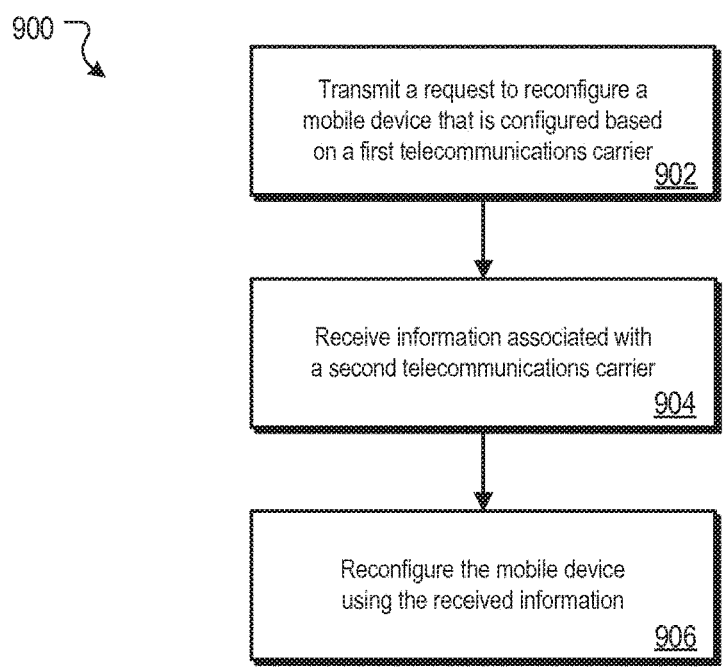
FIG. 9 is a flow diagram of an example carrier reconfiguration process for a mobile device.

FIG. 9 is a flow diagram of an example carrier reconfiguration process 900 for a mobile device (e.g., the mobile devices 100 and 101 of FIGS. 1A-1B, respectively). The process 900 begins with the transmission of a request to reconfigure a mobile device which is presently configured based on a first telecommunications carrier (902). For example, the mobile device may have been previously activated and configured for use on a first telecommunications carrier's network.

In some implementations, the request to reconfigure a mobile device can be triggered automatically when the presently installed smart card is swapped with a new smart card. A security process (e.g., security process 410 of the mobile device 412 of FIG. 4B) can detect the change in the installed smart card. In some implementations, the security process will indicate the change to a core telephony framework in the application framework (e.g., application framework 406 of the software stack 400 of FIG. 4A).

In some implementations, one or more applications (e.g., applications 408 of the software stack 400 of FIG. 4A) monitor the core telephony framework for a notice or indication that the smart card has been replaced. Upon receiving notice or detecting an indication that the smart card has been replaced, these applications can modify one or more settings (e.g., new bookmarks for a web browsing application, new stock quotes for a stock quote application) when the mobile device is reconfigured.

Returning to the process 900, information associated with a second telecommunications carrier is received (904). In some implementations, the received information indicates that the present set of active settings specific to the first telecommunications carrier should be replaced with a set of settings specific to the second telecommunications carrier. In some implementations, the received information includes one or more carrier-specific settings for the second telecommunications carrier.

The mobile device is reconfigured using the received information (906). In some implementations, reconfiguring the mobile device includes reconfiguring the software stack and/or reconfiguring the radio board or other hardware or software components in the mobile device. In some implementations, the reconfiguring mobile device is a personal digital assistant, a cellular telephone, a smart phone, an EGPRS mobile phone, or a media player. In some implementations, the reconfiguring mobile device includes a multi-touch-sensitive display.

Example Activation Policy Determination Process

Figure 10:
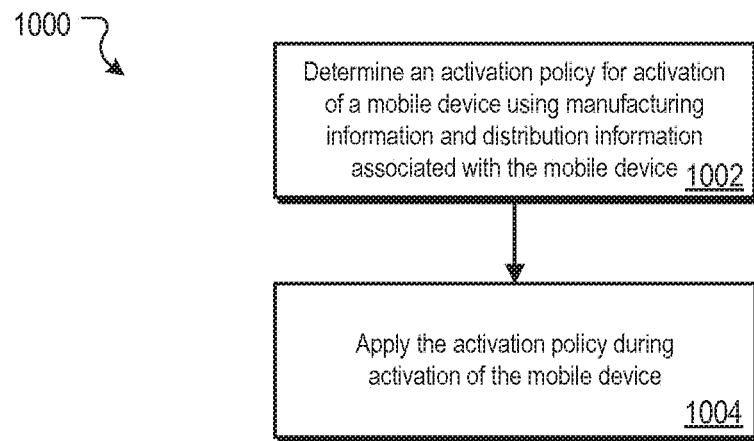
FIG. 10 is a flow diagram of an example activation policy determination process for a mobile device.
Figure 11A:
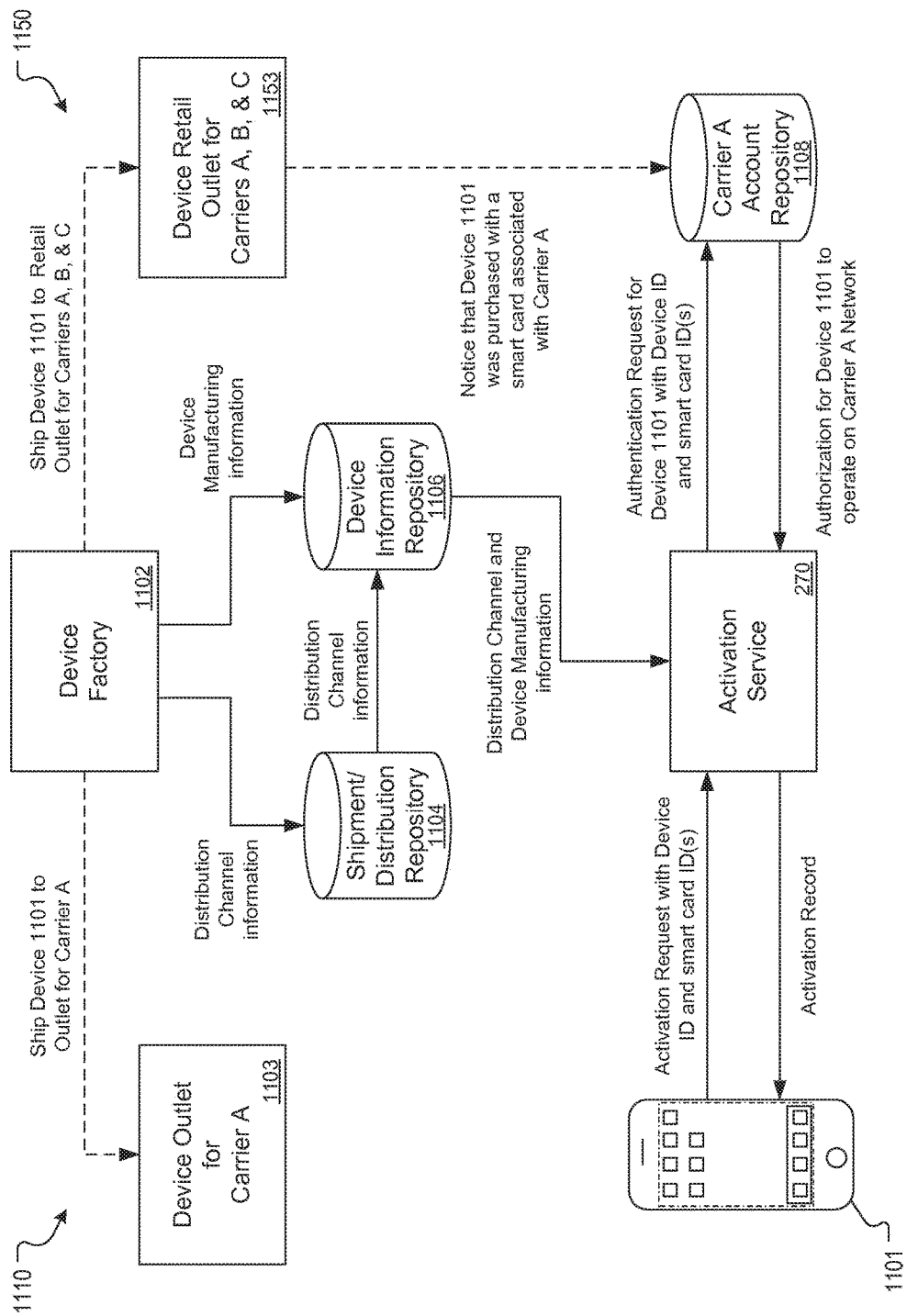
FIG. 11A illustrates two example scenarios for carrier configuration at activation for a mobile device.

FIG. 10 is a flow diagram of an example activation policy determination process 1000 for a mobile device. The example process 1000 will be described in reference to FIG. 11A, FIG. 12A, and FIG. 12B. FIG. 11A illustrates two example scenarios 1110 and 1150 for carrier configuration at activation for a mobile device (e.g., the mobile devices 100 and 101 of FIGS. 1A-1B, respectively). Like the mobile device 501 of FIG. 5, the mobile device 1101 includes generic software which allows the mobile device 1101 to self-configure for a particular telecommunications carrier, e.g., Carrier A, and/or a particular country at the time the mobile device 1101 is activated. FIG. 12A illustrates an example table 1200 of activation policies. FIG. 12B illustrates an example table 1250 of information stored in a device information repository.

The example process 1000 begins with the determination of an activation policy for activation of a mobile device using manufacturing information associated with the mobile device and distribution information associated with the mobile device (1002). For example, an activation service (e.g., the activation service 270 of FIGS. 2 and 11A) can determine the activation policy for activation of the mobile device 1101. In some implementations, an activation policy can be used to generate an activation record or ticket for the mobile device. In some scenarios, a particular mobile device (e.g., as identified by a unique device serial number or the IMEI) can be associated with a single activation policy. In other scenarios, a particular mobile device can be associated with several activation policies.

The example table 1200 of activation policies of FIG. 12A illustrates an example set of possible activation policies for activation of a mobile device. A default policy (e.g., Activation Policy ID 0) is an activation policy associated with a mobile device at the time of manufacturing. In some implementations, the default activation policy allows a country and a telecommunications carrier to be configured for the mobile device at a later time (e.g., at activation). A retail policy for a particular telecommunications carrier (e.g., Activation Policy IDs 1, 3, 5, and 7) is an activation policy that can be applied to a mobile device that is available for purchase from a retail outlet for the particular telecommunications carrier. A service policy for a particular country (e.g., Activation Policy IDs 2, 4, 6, and 8) is an activation policy that can be applied to a service mobile device that is available to an existing user in the particular country, e.g., as a replacement mobile device or a loaner mobile device, as described in further details below. A retail channel policy for a particular country (e.g., Activation Policy IDs 9 and 10) is an activation policy that can be applied to a mobile device that is available for purchase from a retail channel for multiple telecommunications carriers. An unlocked phone policy (e.g., Activation Policy ID 11) is an activation policy for a mobile device that does not require the mobile device to be used with a smart card (e.g., a SIM card) associated with any particular telecommunications carrier and any particular country.

The manufacturing information associated with the mobile device can include one or more identifiers of the mobile device, e.g., a unique device serial number and/or the IMEI. The manufacturing information can be sent from a device factory (e.g., the device factory 1102 of FIG. 11A), which manufactures the mobile device, to a device information repository (e.g., the device repository 1106 of FIG. 11A). The example table 1250 of FIG. 12B illustrates types of information, including IMEI and mobile device serial numbers, which can be stored in a device information repository. In some implementations, a default activation policy is associated with the mobile device at the time of manufacturing (e.g., as the Initial Activation Policy ID column of table 1250). This default activation policy can be overridden by an activation policy determined at a later time, such as at the time of shipment (e.g., the Shipped Activation Policy ID column of table 1250) or the time of activation (e.g., the Applied Activation Policy ID column of table 1250).

The distribution information associated with the mobile device can include information about a distribution channel for the mobile device, e.g., information about a retail outlet where the mobile device is shipped for sale. In the first example scenario 1110 of FIG. 11A, the mobile device 1101 is manufactured in the device factory 1102 and shipped for consumer sale as a finished good to a device outlet for Carrier A 1103. This scenario corresponds to the first scenario of the example table 1250. In some scenarios, the device outlet for Carrier A 1103 is an online outlet. Distribution information can be sent from the device factory 1102 to a shipment/distribution repository 1104. In scenario 1110, the device factory 1102 sends a notice to the shipment/distribution repository 1104 that device 1101 was shipped to an outlet for Carrier A. In the second example scenario 1150, the mobile device 1101 manufactured in the device factory 1102 is shipped for consumer sale as a finished good to a device retail outlet for Carriers A, B, and C 1153. This scenario corresponds to the fourth scenario of the example table 1250. In some scenarios, the device retail outlet for Carriers A, B, and C 1153 is an online retail outlet. The device factory 1102 sends a notice to the shipment/distribution repository 1104 that device 1101 was shipped to a retail outlet for multiple carriers.

Other distribution channels are possible. For example, the manufacturer of the mobile device can distribute the mobile device directly to a user of the mobile device. In one scenario, the mobile device is distributed for use as a loaner mobile device (e.g., the third scenario of the example table 1250). A loaner mobile device can be serially distributed to multiple users as a temporary replacement for each user's malfunctioning mobile device. At the time of shipment of the loaner device, the activation policy can be set to a service activation policy for the particular country. In another scenario, the mobile device is distributed for use as a replacement mobile device (e.g., the second scenario of the example table 1250). A replacement mobile device can be distributed to a user as a permanent replacement for the user's malfunctioning mobile device. At the time of shipment of the replacement device, the activation policy can be set to a service activation policy for the particular country. The distribution information used in determining an activation policy can include information about distribution of the mobile device for use as a service mobile device, e.g., a loaner mobile device or a replacement mobile device. Determining the activation policy can include determining the activation policy of a mobile device that will be replaced by the loaner mobile device or the replacement mobile device. For example, if a user requests activation of a received replacement mobile device, the activation policy determined for activation of the replacement mobile device can be the same activation policy (e.g., a retail activation policy) determined for activation of the user's old mobile device before the old mobile device malfunctioned. This allows the replacement mobile device to inherit the configuration (e.g., as specified by activation records) of the user's old mobile device. The same activation policy determination applies to a loaner mobile device, except that an activation policy (e.g., a retail activation policy) will be determined each time the loaner mobile device is loaned to a different user.

In some implementations, the distribution information associated with the mobile device (e.g., distribution channel information) can be sent from the shipment/distribution repository 1104 to the device information repository 1106. For example, the distribution information can be stored by the device information repository 1106 as illustrated in FIG. 12B. The device information repository 1106 can provide the distribution channel information and the device manufacturing information to the activation service 270. In some implementations, the activation service 270 queries the device information repository 1106 for this information in response to receiving a request for activation from the mobile device 1101 (e.g., through a mobile services application 420 of FIG. 4B).

Returning to the example process 1000, the activation policy can be determined from multiple activation policies associated with a distribution channel for the mobile device. In the second example scenario 1150, where the distribution channel for the mobile device 1101 includes shipment to the device retail outlet for Carriers A, B, and C 1153, the mobile device 1101 can be associated with several activation policies. In some implementations, each activation policy of the multiple activation policies can be associated with at least one telecommunications carrier of multiple telecommunications carriers. In scenario 1150, each activation policy for the mobile device 1101 is associated with at least one of Carrier A, Carrier B, and Carrier C.

In some implementations, a smart card (e.g., a SIM card) installed in the mobile device can have at least one identifier (e.g., the ICCID or the IMSI) associated with a telecommunications carrier. In these implementations, the activation policy can be determined from the multiple activation policies using at least one identifier associated with the telecommunications carrier. For the example scenario 1150, a user who purchases the mobile device 1101 can also purchase a smart card associated with Carrier A. If the purchased smart card is a SIM card, the issuer identifier code of the ICCID and/or the mobile network code (MNC) of the IMSI can identify the associated telecommunications carrier as Carrier A. If one of the several activation policies associated with the mobile device 1101 distributed to the retail outlet 1153 is associated with Carrier A (e.g., Activation Policy ID 1), this activation policy can be determined for activation of the mobile device 1101. In some implementations, notice that the mobile device 1101 was purchased with a smart card associated with Carrier A is sent from the device retail outlet for Carriers A, B, and C 1153 to a Carrier A account repository 1108 to be used in authenticating the mobile device 1101. In some implementations, this information is also sent to the activation service 270, e.g., through the device information repository 1106.

In some implementations, each activation policy of multiple activation policies is associated with a country. The mobile device can include generic software which allows the mobile device to self-configure for a particular country at the time the mobile device is activated. For example, the mobile device can self-configure for a particular country as identified by the country code of the ICCID and/or the mobile country code (MCC) of the IMSI of a SIM card installed in the mobile device.

In some countries, the mobile device can only be used with a particular telecommunications carrier. In these countries, only one activation policy for the country/carrier pair may be available. In other countries, the mobile device can be used with any of multiple telecommunications carriers. In these countries, an activation policy may be available for each country/carrier pair. In other countries, the mobile device manufacturer may not have partnered with any telecommunications carriers. In these countries, an activation policy for the mobile device may only be associated with the country and may not be associated with any particular telecommunications carrier. In other words, an activation policy for the mobile device in one of these countries can be used to activate service with any telecommunications carrier that operates using the one or more communication protocols for which the mobile device is designed.

Returning to the example process 1000, the activation policy is applied during activation of the mobile device (1004). For example, the activation service 270 can apply the determined activation policy during activation of the mobile device 1101. In some implementations, a telecommunications carrier can securely connect to an activation server (e.g., through a secure web service) of the activation service 270 to authorize the latest activation policy to be overridden by a different activation policy. When this occurs, the overriding activation policy is applied during activation of the mobile device. This scenario corresponds to the fifth scenario of the example table 1250, where the telecommunications carrier, Carrier B, authorizes the Shipped Activation Policy ID 3 to be overridden by Applied Activation Policy ID 11, which allows the mobile device to be used with a smart card associated with any particular carrier. Prior to the authorization, the mobile device was "locked" to use with a smart card associated with Carrier B. Authorization provided by Carrier B through the secure connection unlocks the mobile device without requiring a secure code to be transmitted to the mobile device.

In some implementations, applying the activation policy during activation of the mobile device can include generating an activation record or ticket for the mobile device using the determined activation policy. For example, an activation record generation server (not shown in FIG. 11A) can securely connect to the activation service 270 to transmit an activation record based on the activation policy. Information about the type of activation record or ticket generated for the mobile device can be stored, e.g., in the device information repository.

The activation record or ticket can require that a smart card installed in the mobile device has an identifier associated with a particular telecommunications carrier. For the example scenario 1110, the activation record or ticket for the mobile device 1101 can require that the SIM card installed in the mobile device 1101 (e.g., a first SIM card installed before first activation or a subsequent SIM card installed before re-activation) has an ICCID and/or an IMSI associated with Carrier A.

Alternatively, the activation record or ticket can allow a smart card installed in the mobile device to have an identifier associated with any of multiple telecommunications carriers. This scenario corresponds to the Activation Policy ID 11 of the fifth scenario of the example table 1250. An activation record or ticket generated using the Activation Policy ID 11 allows a SIM card installed in the mobile device (e.g., a first SIM card installed before first activation or a subsequent SIM card installed before re-activation) to have an ICCID and/or an IMSI associated with any of multiple telecommunications carriers. Information about this "wildcard" activation record or ticket can be stored in the device information repository.

In some implementations, one or more settings (e.g., carrier-specific settings or country-specific settings) and/or files (e.g., content, application, or other software) are sent to the mobile device 1101 during or just after activation. These settings or files can be pushed from the activation service 270 to the mobile device 1101 (e.g., through a mobile services application 420 of FIG. 4B) or pulled by the mobile device 1101 using a wired and/or wireless network. For example, if the mobile device 1101 is associated with a particular enterprise (e.g., a company, an agency, or an institution), activation of the mobile device 1101 can trigger settings, content, and/or applications specific to the enterprise to be downloaded. In some implementations, upon activation of the mobile device 1101, the enterprise user is redirected on the mobile device 1101 to an enterprise portal or store through which enterprise-approved applications are available for purchase or free download. In some implementations, content can be unlocked and authorized for download at the time of activation of the mobile device 1101. The ability to download content at or after activation can reduce the amount of content that must be preloaded on the mobile device 1101.

Updating Carrier-Specific Configuration Bundles

Figure 11B:
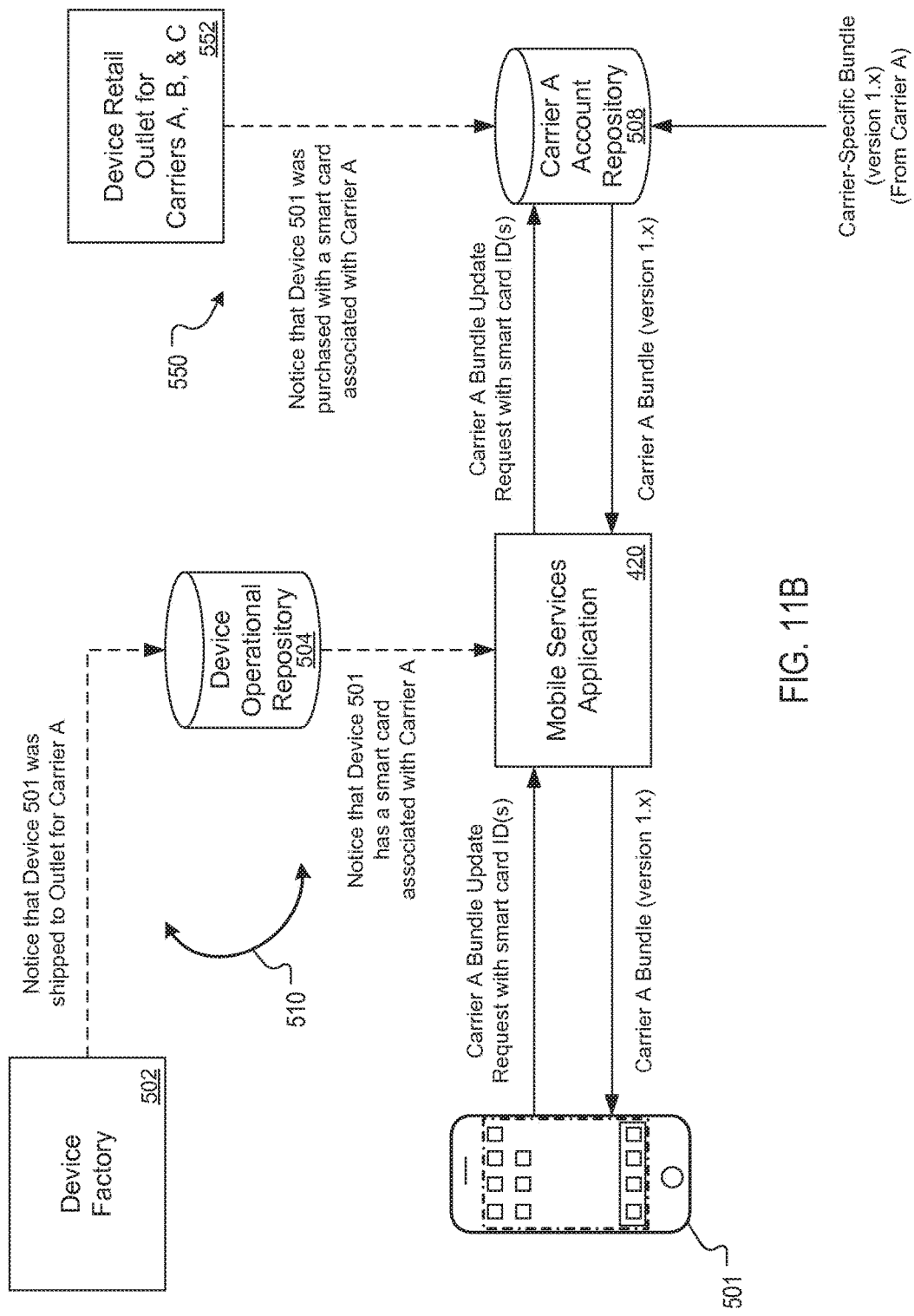
FIG. 11B illustrates an example scenario for updating a carrier configuration bundle on a mobile device.

FIG. 11B illustrates an example scenario for updating a carrier-specific configuration bundle on the mobile device 501. A carrier-specific configuration bundle can be a directory or package including multiple pieces of software (e.g., applications and plug-ins) specific to a particular carrier. Bundling allows the multiple pieces of software, which can be related, to be distributed and installed together. The mobile device 501 can be configured using a carrier-specific configuration bundle which can be applied on the mobile device 501 at activation time. Since carriers (e.g., carrier A) may update the configuration bundle after activation, the mobile services application 420 (e.g., iTunes™ Music Store for iPhone™) can be configured to provide updatable carrier-specific configuration bundles to the mobile device 501 post activation.

In some implementations, the latest version of a carrier-specific configuration bundle (in this example, a Carrier A configuration bundle) can be provided for distribution to replace an existing configuration bundle on mobile device 501 and other mobile devices using the carrier service. For example, a carrier-specific configuration bundle can be approved by Carrier A, available in the Carrier A account repository 508 for distribution, and posted by the mobile services application 420. When the mobile device 501 is in communication (e.g., wireless or wired communication) with the mobile services application 420, the mobile services application 420 can determine if the mobile device 501 has the latest version of the Carrier A configuration bundle. This determination can include comparing a version number in the carrier configuration bundle currently installed on the mobile device 501 with the version number currently available in the account repository 508. If a later version is available, an update process can be initiated by the mobile services application 420 or the mobile device 501.

The update process can be transparent to the user of the mobile device 501 or require user input, such as agreeing to an online license using touch input. The update process can include downloading a new bundle version to local cache on the mobile device 501, where the bundle can be unpacked and installed by the mobile device 501. In some implementations, a new bundle is not downloaded. Rather, one or more properties of the currently installed bundle are replaced with new properties. In some implementations, the carrier-specific configuration bundle is an XML file or a property list file (e.g., .plist file used in Mac OS X). Example information that can be included in a carrier-specific configuration bundle includes a default stock pick, bookmarks, service menu, carrier logo image (e.g., for a status bar), etc. The configuration bundle information can also include authorization for using third party applications with that particular carrier.

In some implementations, carrier-specific configuration bundles can be associated with a smart card (e.g., a SIM card) installed in the mobile device 501. For example, the IMSI and/or ICCID number stored in the SIM card can provide a country code and network code which can be used to determine carrier-specific configuration bundles for download or update. The country code can allow carrier-specific bundles to be localized to specific geographic regions, such as providing default settings for map, weather, and world clock applications and using country-specific number formats (e.g., for phone numbers and dates).

In some implementations, the mobile services application 420 can provide a carrier configuration bundle or update that is specifically tailored to supporting a particular enterprise. The IMSI and/or ICCID from the mobile device SIM card can be associated with an enterprise and used by the mobile services application 420 to determine an enterprise-specific carrier configuration bundle to download to the mobile device 501.

In some implementations, the mobile device 501 can download or update a carrier-specific configuration bundle directly from the carrier without communicating with the mobile services application 420 of the access device 218 of FIG. 4B. For example, a mobile services application local to the mobile device 501 can determine if the mobile device 501 has the latest version of the carrier-specific configuration bundle. If a later version configuration bundle is available, the mobile device 501 can wirelessly download and install the later bundle from the carrier (e.g., through the carrier's account repository). In some implementations, a property list file can identify the version of the configuration bundle.

Example Configuration Bundle Update Process

Figure 13:
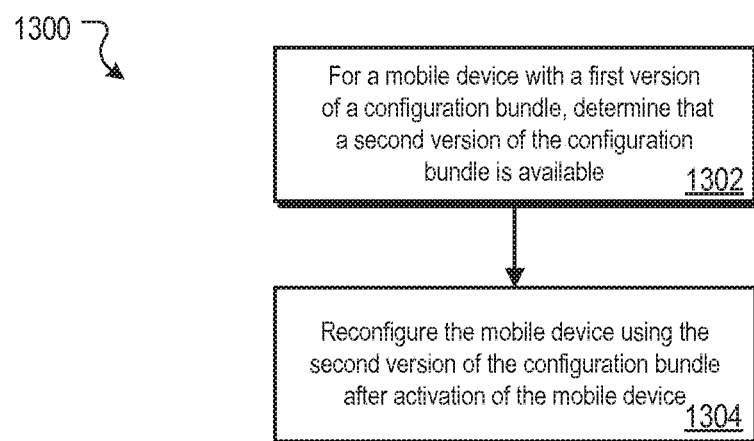
FIG. 13 is a flow diagram of an example configuration bundle update process for a mobile device.

FIG. 13 is a flow diagram of an example configuration bundle update process 1300 for a mobile device (e.g., the mobile devices 100 and 101 of FIGS. 1A-1B, respectively). The process 1300 begins with a mobile device which has been activated and configured with a first version of a configuration bundle. In some implementations, the configuration bundle is specific to a particular telecommunications carrier and/or a particular enterprise.

A second version of the configuration bundle is determined to be available, where the second version is a later version than the first version (1302). The mobile device is reconfigured using the second version of the configuration bundle (1304). For example, the mobile device can request a configuration bundle update from an access device in communication with the mobile device (e.g., through the mobile services application 420 of FIG. 11B). In response, the access device can transmit the latest version of the configuration bundle to the mobile device for reconfiguration.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method comprising:
determining, by an activation service server, an activation policy for activation of a mobile device for cellular wireless service using: i) manufacturing information associated with the mobile device, ii) distribution information associated with the mobile device, and iii) authorization from a telecommunications carrier to override a latest activation policy with an overriding activation policy; and
applying the activation policy during activation of the mobile device, wherein applying the activation policy comprises:
sending, by the activation service server to the mobile device, an activation record based on the activation policy, wherein:
i) the activation policy is stored in a device information repository prior to the activation of the mobile device,
ii) the device information repository is remote from the mobile device; and
iii) the activation policy replaces a previously stored activation policy in the mobile device.

2. The method of claim 1, wherein the distribution information includes information about a distribution channel for the mobile device.

3. The method of claim 1, wherein the determining the activation policy further includes:
determining, by the activation service server, the activation policy from a plurality of activation policies associated with a distribution channel for the mobile device.

4. The method of claim 1, wherein the activation policy requires activation with a particular telecommunications carrier.

5. The method of claim 1, wherein the activation policy allows activation with either of two particular telecommunications carriers.

6. The method of claim 1, wherein the activation policy allows the mobile device to inherit activation records associated with a second mobile device.

7. The method of claim 1, wherein the activation policy enables access by the mobile device to telecommunications service in only one country.

8. The method of claim 1, wherein the applying the activation policy further comprises:
storing information about a type of the activation record in the device information repository.

9. The method of claim 1, wherein the distribution information indicates that the mobile device is a replacement mobile device.

10. The method of claim 1 further comprising:
receiving, from the mobile device prior to the determining, an activation request.

11. The method of claim 10, wherein the receiving of an activation request is via a mobile services application.

12. The method of claim 10, wherein the activation request comprises a smart card serial number.

13. The method of claim 12, wherein the determining is based on the smart card serial number.

14. An application service server comprising:
a memory; and
a processor coupled to the memory, wherein the memory stores instructions that when executed by the processor cause the application service server to perform steps comprising:
determining an activation policy for activation of a mobile device using: i) manufacturing information associated with the mobile device ii) distribution information associated with the mobile device, and iii) authorization from a telecommunications carrier to override a latest activation policy with an overriding activation policy; and
applying the activation policy during activation of the mobile device, wherein applying the activation policy comprises:
sending, to the mobile device, an activation record based on the activation policy, wherein:
i) the activation policy is stored in a device information repository prior to the activation of the mobile device,
ii) the device information repository is remote from the mobile device; and
iii) the activation policy replaces a previously stored activation policy in the mobile device.

15. The application service server claim 14, wherein the distribution information includes information about a distribution channel for the mobile device.

16. The application service server claim 14, wherein the activation policy requires activation with a particular telecommunications carrier.

17. The application service server claim 14, wherein the activation policy allows activation with either of two particular telecommunications carriers.

18. The application service server claim 14, wherein the activation policy allows the mobile device to inherit activation records associated with a second mobile device.

19. A non-transitory computer readable medium comprising a memory that stores instructions that when executed cause an application service server to perform steps comprising:
determining an activation policy for activation of a mobile device using: i) manufacturing information associated with the mobile device, ii) distribution information associated with the mobile device, and iii) authorization from a telecommunications carrier to override a latest activation policy with an overriding activation policy; and
applying the activation policy during activation of the mobile device, wherein applying the activation policy comprises:
sending, to the mobile device, an activation record based on the activation policy, wherein:
i) the activation policy is stored in a device information repository prior to the activation of the mobile device,
ii) the device information repository is remote from the mobile device; and
iii) the activation policy replaces a previously stored activation policy in the mobile device.

20. The non-transitory computer readable medium of claim 19, wherein the activation policy requires activation with a particular telecommunications carrier.

* * * * *